US008901275B2

(12) United States Patent
Hamaguchi et al.

(10) Patent No.: US 8,901,275 B2
(45) Date of Patent: Dec. 2, 2014

(54) METHOD FOR PRODUCING CRYSTALLIZED POLYESTER

(75) Inventors: Mitsushige Hamaguchi, Nagoya (JP); Takuma Naotsuka, Tokai (JP); Yoshitake Takahashi, Tokai (JP); Toru Takahashi, Nagoya (JP); Hiroyuki Ome, Tokai (JP)

(73) Assignee: Toray Industries, Inc., Tokyo (JP)

( * ) Notice: Subject to any disclaimer, the term of this patent is extended or adjusted under 35 U.S.C. 154(b) by 67 days.

(21) Appl. No.: 13/321,022

(22) PCT Filed: Jun. 17, 2010

(86) PCT No.: PCT/JP2010/060281
§ 371 (c)(1),
(2), (4) Date: Nov. 17, 2011

(87) PCT Pub. No.: WO2010/147176
PCT Pub. Date: Dec. 23, 2010

(65) Prior Publication Data
US 2012/0065342 A1 Mar. 15, 2012

(30) Foreign Application Priority Data
Jun. 17, 2009 (JP) ................................. 2009-143772

(51) Int. Cl.
*C08G 63/91* (2006.01)
*C08G 63/88* (2006.01)
*C08G 63/08* (2006.01)

(52) U.S. Cl.
CPC ............... *C08G 63/88* (2013.01); *C08G 63/08* (2013.01)
USPC ........... 528/354; 525/410; 525/411; 525/415; 525/437

(58) Field of Classification Search
CPC ........ C08G 63/08; C08G 63/88; C08L 67/02; C08L 67/04
USPC ............... 525/437, 450, 411, 415; 528/309.1, 528/308.8, 354, 196, 361
See application file for complete search history.

(56) References Cited

U.S. PATENT DOCUMENTS

| 3,846,377 | A | * | 11/1974 | Siegmann | 264/211.14 |
| 5,075,115 | A | * | 12/1991 | Brine | 424/486 |
| 5,324,816 | A | * | 6/1994 | Khanna et al. | 528/481 |
| 5,725,881 | A | * | 3/1998 | Buchholz et al. | 424/486 |
| 6,429,280 | B1 | * | 8/2002 | Hiraoka et al. | 528/354 |
| 6,462,105 | B1 | * | 10/2002 | Kuroki et al. | 523/351 |
| 6,691,558 | B1 | * | 2/2004 | Lin et al. | 73/54.01 |
| 7,754,826 | B1 | * | 7/2010 | Smith et al. | 525/450 |
| 2003/0171528 | A1 | | 9/2003 | Sakurai | |
| 2009/0118241 | A1 | * | 5/2009 | Andjelic et al. | 514/159 |
| 2009/0246544 | A1 | * | 10/2009 | Narita et al. | 428/480 |
| 2010/0056751 | A1 | | 3/2010 | Toyohara et al. | |

FOREIGN PATENT DOCUMENTS

| EP | 1184008 A1 * | 3/2002 |
| JP | 08165339 A | 6/1996 |
| JP | 2001192442 A | 7/2001 |
| JP | 2003048970 A | 2/2003 |
| JP | 2003071834 A | 3/2003 |
| JP | 2005336238 A | 12/2005 |
| JP | 2006037056 A | 2/2006 |
| JP | 2009013352 A | 1/2009 |
| JP | 2009024058 A | 2/2009 |
| JP | 2009024081 A | 2/2009 |
| JP | 2009067856 A | 4/2009 |
| TW | 200838902 A | 10/2008 |
| WO | WO 2007139236 A1 * | 12/2007 |
| WO | WO 2008096895 A1 * | 8/2008 |

OTHER PUBLICATIONS

International Application Serial No. PCT/JP2010/060281, International Search Report mailed Jul. 27, 2010, 4 pgs.

* cited by examiner

*Primary Examiner* — Randy Gulakowski
*Assistant Examiner* — Christopher M Rodd
(74) *Attorney, Agent, or Firm* — RatnerPrestia

(57) ABSTRACT

A method for producing a crystallized polyester comprises the crystallization step of applying a shear and/or a pressure to a polyester selected from an aliphatic polyester and a polyalkylene terephthalate at a temperature of (Tm−70° C.) to (Tm+20° C.), where Tm is a melting point of the polyester, thereby converting the polyester into a state having a crystallinity of 10% or more and fluidity.

12 Claims, No Drawings

METHOD FOR PRODUCING CRYSTALLIZED POLYESTER

CROSS-REFERENCE TO RELATED APPLICATIONS

This application is the U.S. National Phase application of PCT International Application No. PCT/JP2010/060281, filed Jun. 17, 2010, and claims priority to Japanese Patent Application No. JP 2009-143772, filed Jun. 17, 2009, the disclosures of which PCT and priority applications are incorporated herein by reference in their entirely for all purposes.

TECHNICAL FIELD

The present invention relates to a polyester resin which has satisfactory crystallization properties and excellent processability, and a method for producing the same.

BACKGROUND OF THE INVENTION

Crystalline polyesters, particularly an aliphatic polyester and a polyalkylene terephthalate, have widely been employed since they exhibit excellent mechanical characteristics and heat resistance by crystallization. However, among polyester resins, a polylactic acid resin has a problem that it exhibits a low crystallization rate and therefore requires a crystallization treatment for a long time so as to obtain sufficiently crystallinity. Accordingly, various methods of improving the crystallinity have been studied (Patent Documents 1 to 4, etc.). However, any method is a method of adding a crystallization accelerator such as a nucleating agent and therefore has a problem that mechanical properties of the resin deteriorate when the additive amount of the crystallization accelerator is increased by enhancing the crystallinity.

In the prior art, there has been usually used a method in which a polyester resin in a molten state is pelletized by cooling using a water bath or the like for processing of the polyester resin. However, in this case, pellets in an amorphous state are obtained since the polyester resin is quenched from a molten state. When these pellets are subjected to a solid phase polymerization, pellets fuse to each other in the amorphous state, and thus requiring the step in which pellets are crystallized by performing a heat treatment or the like in advance. When the polyester resin has a low molecular weight, there occurs a problem that pellets are likely to fuse to each other in the crystallization step performed in advance since the polyester resin has a low softening point.

PATENT DOCUMENTS

Patent Document 1: Japanese Unexamined Patent Publication (Kokai) No. 2001-192442
Patent Document 2: Japanese Unexamined Patent Publication (Kokai) No. 2009-13352
Patent Document 3: Japanese Unexamined Patent Publication (Kokai) No. 2009-24058
Patent Document 4: Japanese Unexamined Patent Publication (Kokai) No. 2009-24081
Patent Document 5: Japanese Unexamined Patent Publication (Kokai) No. 2009-67856

SUMMARY OF THE INVENTION

The present invention provides a method for producing a polyester resin which has excellent melt processability and also has satisfactory crystallization properties.

As a result of an intensive study, the present invention employs the following means.

The present invention provides, according to one embodiment, a method for producing a crystallized polyester including the crystallization step of applying a shear and/or a pressure to a polyester selected from an aliphatic polyester and a polyalkylene terephthalate at a temperature of (Tm−70° C.) to (Tm+20° C.), where Tm is a melting point of the polyester, thereby converting the polyester into a state having a crystallinity of 10% or more and fluidity, and the crystallized polyester obtained by the same.

According to the present invention, a crystallized polyester having fluidity can be obtained in spite of having a crystal structure. The crystallized polyester according to embodiments of the present invention has moderate fluidity by means of crystallization and therefore can provide a molded article which has excellent melt processability and also has high crystallinity. Since it is not necessary to perform the crystallization step in advance when solid phase polymerization is performed, the present invention is suited for the production of a high molecular weight polyester by solid phase polymerization.

DETAILED DESCRIPTION OF THE INVENTION

The method for producing a crystallized polyester of embodiments of the present invention is characterized in that the crystallized polyester as a raw material is produced through the crystallization step of applying a shear and/or a pressure at a temperature of (Tm−70° C.) to (Tm+20° C.), where Tm is a melting point of the polyester, thereby converting the polyester into a state having a crystallinity of 10% or more and fluidity.

The melting point (Tm) of the polyester as the raw material is a peak-top temperature of a fusion peak of crystallization, which appears when the measurement is performed at a temperature increasing rate of 20° C./minute using a differential scanning calorimeter.

The crystallinity of the obtained crystallized polyester is preferably 15% or more, more preferably 20% or more, and particularly preferably 30% or more. The crystallinity is preferably 70% or less.

The crystallinity can be measured by the following procedure. A polymer at a temperature within a range of (Tm−70° C.) to (Tm+20° C.) in a state having fluidity was quenched by ice water, liquid nitrogen and the like to freeze a crystal structure and a wide angle x-ray diffraction is measured, and then the crystallinity can be measured from an area ratio of a halo region of an amorphous portion and a diffraction peak region of a crystal portion.

In the judgment of the degree of crystallization, crystallization enthalpy upon temperature increase ($\Delta Hc$) obtained by measuring using a differential scanning calorimeter, and the value calculated as a crystallization rate from the following formula using the value of crystal melting enthalpy ($\Delta Hm$) are useful as indicators:

$$[(\Delta Hm - \Delta Hc)/\Delta Hm] \times 100 (\%)$$

where $\Delta Hm$ denotes crystal melting enthalpy of a molded article, and $\Delta Hc$ denotes a crystallization enthalpy upon temperature increase of a molded article.

The state where the polymer has fluidity is a state where the polymer melt-flows without being solidified in the form of a powder or solid. The fact that the polymer has fluidity can be visually observed. Melt viscosity of the polymer having fluidity can be measured using an on-line rheometer mounted to a melting machine. When an off-line rheometer is used, it is possible to measure by setting arbitrary temperature and shear.

In the state of having fluidity, the melt viscosity is preferably 10,000 Pa·s or less, more preferably 1,000 Pa·s or less, and particularly preferably 700 Pa·s or less. The melt viscosity is preferably 0.001 Pa·s or more, more preferably 0.01 Pa·s or more, and particularly preferably 0.1 Pa·s or more.

The crystallized polyester of embodiments of the present invention has such an effect that flow stability and processability are improved since a melt tension is increased by crystallization while maintaining the fluidity. Particularly, when an oligomer or a prepolymer is used as the polyester to be supplied, the above effect becomes remarkable. In the prior art, when the oligomer or prepolymer is used, there was a problem with melt processability, for example, the oligomer or prepolymer is likely to undergo drawdown upon melting since it has low melt viscosity. However, according to the method of the present invention, even in case of a low molecular weight polyester such as the oligomer or prepolymer, a crystallized polyester having excellent flow stability and processability can be obtained.

Usually, the crystallized polyester has no fluidity and, for example, when the polyester is crystallized in an extruder, the extruder is stopped or the polyester is ejected as a solidified indeterminate form or powder by solidification. However, the crystallized polyester of embodiments of the present invention has stable fluidity and therefore can be process into a given shape as it is.

As described above, it is possible to easily crystallize even an aliphatic polyester having a low crystallization rate and a low molecular weight oligomer or prepolymer by apply shear and/or pressure to a polyester as a raw material under specific temperature conditions to crystallize the polyester. It is also possible to obtain pellets having high crystallinity, which was difficult in the prior art. In the prior art, since the polyester is quenched in case of obtaining pellets after completion of the polymerization step of the polyester, only pellets having nearly no crystal structure in an amorphous state could be obtained. Therefore, the step of performing heating crystallization before used in the subsequent steps such as melt processing and solid phase polymerization was required. However, there was a problem that pellets fuse to each other in the heat crystallization step. The crystallized polyester of embodiments of the present invention has high crystallinity while maintaining the fluidity. Therefore, even if the crystallized polyester in a flow state is quenched and solidified, pellets having a high crystallinity can be obtained. Accordingly, even if the obtained pellets are subjected to the solid phase polymerization step as they are without subjecting to the heat crystallization step, a problem such as fusion of pellets does not occur. In addition, since it is easy to control a crystal structure, the crystallized polyester has an excellent effect capable of obtaining high reactivity in the solid phase polymerization. The method of crystallizing pellets of the prior art by heating also had a problem that unevenness in crystallinity in or between pellets increases. The method of the present invention has an excellent effect capable of obtaining pellets having small unevenness in crystallinity.

There is no particular limitation on the crystallinity of the raw polyester to be subjected to the crystallization step in the present invention, and the crystallinity is preferably less than 10%, and more preferably less than 5%. Since the effect is to efficiently increase the crystallinity of the raw polyester, the effects of the present invention often become higher as the crystallinity of the raw polyester becomes lower. It is also possible to subject the polyester obtained by polymerizing the monomer to the crystallization step of the present invention as it is in a molten state without being solidified, and this method is preferably performed.

Examples of the method for producing a crystallized polyester of the present invention include a method in which a polyester resin in a molten state is retained in a melting machine at a temperature of (Tm−70° C.) to (Tm+20° C.) while applying a shear, a method in which a polyester resin in a molten state is retained in a melting machine at a temperature of (Tm−70° C.) to (Tm+20° C.) while applying a pressure and the like. At this time, there is no limitation on the melting machine as long as it can apply the shear or pressure, and it is possible to use a polymerization tank, a kneader, a Banbury mixer, a single screw extruder, a multi-screw extruder such as a twin screw extruder, an injection molding machine and the like. In the crystallization step, it is preferred that a melt is uniformly stirred. When the polyester resin is crystallized in a reaction vessel or the like, a difference in melt viscosity after crystallization may sometimes occur, resulting in a state where a part or all of the polyester resin is being adhered to a stirring blade or a wall surface. However, it is not preferred to pass through the state. Therefore, the crystallization step is preferably performed by a single screw extruder or a multi-screw extruder, and more preferably a single screw extruder or a twin screw extruder. From the viewpoint of uniformity of crystallinity of the obtained crystallized polyester, the rotating speed of the extruder is preferably from 50 to 1,000 rpm, more preferably from 80 to 500 rpm, and particularly preferably from 100 to 400 rpm.

The retention temperature in the melting machine is preferably within a range from (Tm−50° C.) to (Tm+20° C.), more preferably from (Tm−40° C.) to Tm, and particularly preferably from (Tm−30° C.) to (Tm−5° C.). In the prior art, the temperature of the melting machine is set at a temperature which is higher than (Tm+20° C.) so that the resin melts to exhibit satisfactory fluidity. However, in the present invention, it is not preferred to retain at a temperature which is higher than (Tm+20° C.) since a crystal melts again even if the crystal is formed. In contrast, it is not preferred that the temperature of the melting machine is lower than (Tm−70° C.) since fluidity of the crystallized polyester drastically decreases.

The magnitude of the shear is expressed by a shear rate. The value calculated by a known empirical formula is used as the shear rate in the present invention. For example, in case of a twin screw extruder, as shown in the following equation, the shear rate can be calculated from a diameter of a screw, clearance between the screw and the extruder, and a rotating speed of the screw.

$$(\text{Shear rate}) = \pi \times (\text{screw diameter}) \times (\text{screw rotating speed}) / (\text{clearance between screw and extruder})$$

The rate of the shear to be applied is preferably within a range from 1 to 600/second, and more preferably from 10 to 400/second. In case of a low shear rate, the crystallization requires a long time. In case of too high shear rate, the resin temperature increases by shear heat generation and thus thermal decomposition may be likely to occur.

The pressure is a resin pressure which is applied to the melting machine when the polyester as the raw material is retained in the melting machine, and the pressure can be measured by a pressure gauge disposed in the melting machine.

The pressure to be applied is preferably from 0.02 to 50 MPa, and particularly preferably from 0.05 to 10 MPa. When the pressure is too low or high, the crystallization requires a long time.

Furthermore, it is particularly preferred to retain while simultaneously applying the shear of a shear rate of 10 to 400/second and the pressure of 0.05 to 10 MPa since it is possible to crystallize within a short time.

The retention time of the polyester in the melting machine is preferably within a range from 0.01 minute to 60 minutes, more preferably from 0.1 minute to 10 minutes, and more preferably from 0.5 minute to 5 minutes. When the retention time is too short, the polyester is not sufficiently crystallized. In contrast, when the retention time is more than 60 minutes, thermal decomposition is likely to be caused by retention.

When the polymer has transparency in an amorphous state, polymer turbidity varies with crystallization, resulting in whitening. Therefore, the melting machine is provided with an observation window, through which the polymer in the melting machine can be observed, and turbidity of the polymer in the melting machine is observed through the observation window, and thus making it possible to judge the degree of crystallization by the turbidity. The structure (kneading screw, etc.) in the melting machine can be clearly observed in a state where the crystallization scarcely proceeds, whereas, the polymer causes white turbidity with the progress of the crystallization, and thus the structure in the melting machine becomes dim. When the crystallinity exceeds 10% and the crystallization sufficiently proceeds, the polymer becomes white opaque and thus the structure in the melting machine cannot be entirely observed.

The aliphatic polyester used in the present invention is preferably a polymer or copolymer obtained by polymerizing one or more kinds selected from (1) a dicarboxylic acid or an ester-forming derivative thereof and a diol or an ester-forming derivative thereof, (2) hydroxycarboxylic acid or an ester-forming derivative thereof, and (3) lactone.

Examples of the dicarboxylic acid or ester-forming derivative thereof include aliphatic dicarboxylic acids such as oxalic acid, succinic acid, adipic acid, sebacic acid, azelaic acid, dodecanedioic acid, malonic acid, glutaric acid and dimer acid; alicyclic dicarboxylic acids such as 1,3-cyclohexanedicarboxylic acid and 1,4-cyclohexanedicarboxylic acid; and ester-forming derivatives thereof. Two or more kinds of these compounds may be used in combination.

Examples of the diol or ester-forming derivative thereof include aliphatic glycols having 2 to 20 carbon atoms, such as ethylene glycol, propylene glycol, 1,4-butanediol, neopentyl glycol, 1,5-pentanediol, 1,6-hexanediol, decamethylene glycol, cyclohexanedimethanol, cyclohexanediol, isosorbide and dimerdiol; long chain glycols having a molecular weight of 200 to 100,000, such as polyethylene glycol, poly-1,3-propylene glycol and polytetramethylene glycol; and ester-forming derivatives thereof. Two or more kinds of these compounds may be used in combination.

Examples of the hydroxycarboxylic acid include glycolic acid, lactic acid, hydroxypropionic acid, hydroxybutyric acid, hydroxyvaleric acid, hydroxycaproic acid, ester-forming derivatives thereof and the like. Two or more kinds of these compounds may be used in combination.

Examples of the lactone include caprolactone, valerolactone, propiolactone, undecalactone, 1,5-dioxepan-2-one and the like.

Examples of the aliphatic polyester including the aliphatic dicarboxylic acid or ester-forming derivative thereof and the aliphatic diol or ester-forming derivative thereof as main structural units include polyethylene oxalate, polypropylene oxalate, polybutylene oxalate, polyethylene succinate, polypropylene succinate, polybutylene succinate, polyethylene adipate, polypropylene adipate, polybutylene adipate, polyneopentyl glycol adipate, polyethylene sebacate, polypropylene sebacate, polybutylene sebacate, polyethylene succinate/adipate, polypropylene succinate/adipate, polybutylene succinate/adipate and the like.

Examples of the aliphatic polyester including aliphatic hydroxycarboxylic acid or ester-forming derivative thereof as a main structural unit include polyglycolic acid, polylactic acid, polyglycolic acid/lactic acid, polyhydroxybutyric acid/β-hydroxybutyric acid/β-hydroxyvaleric acid and the like. Polyglycolic acid and polylactic acid are preferred, and polylactic acid is more preferred.

Examples of the aliphatic polyester obtained by polymerizing the lactone include polycaprolactone, polyvalerolactone, polypropiolactone, polycaprolactone/valerolactone and the like.

When the aliphatic polyester is polylactic acid, a D-isomer and an L-isomer exist since lactic acid as a monomer has asymmetric carbon in the molecule. It is possible to use, as the polylactic acid, any of poly-L-lactic acid as a homopolymer of L-lactic acid, poly-D-lactic acid as a homopolymer of D-lactic acid, random copolymer obtained by copolymerizing L-lactic acid with D-lactic acid, a block copolymer of L-lactic acid and D-lactic acid, a mixture of these polymers and the like. The block copolymer is composed of a segment of an L-lactic acid unit and a segment of a D-lactic acid unit. The segment of a L-lactic acid unit preferably includes an L-lactic acid unit in the amount of 70 mol % or more, more preferably 90 mol % or more, still more preferably 95 mol % or more, and particularly preferably 98 mol % or more. The segment of a D-lactic acid unit preferably includes a D-lactic acid unit in the amount of 70 mol % or more, more preferably 90 mol % or more, still more preferably 95 mol % or more, and particularly preferably 98 mol % or more.

In the present invention, the polylactic acid may contain the other component unit except for the L-lactic acid or D-lactic acid unit, as long as performances of the obtained polylactic acid are not impaired. Examples of the other component unit include polyhydric carboxylic acid, polyhydric alcohol, hydroxycarboxylic acid, lactone and the like. Specific examples thereof include polyhydric carboxylic acids or derivatives thereof, such as succinic acid, adipic acid, sebacic acid, fumaric acid, terephthalic acid, isophthalic acid, 2,6-naphthalenedicarboxylic acid, 5-sodiumsulfoisophthalic acid, cyclohexanedicarboxylic acid and 5-tetrabutylphosphoniumsulfoisophthalic acid; polyhydric alcohols or derivatives thereof, such as polyhydric alcohols obtained by adding ethylene oxide or propylene oxide to ethylene glycol, propylene glycol, butanediol, pentanediol, hexanediol, octanediol, isosorbide, neopentyl glycol, glycerin, trimethylolpropane, pentaerythritol, trimethylolpropane and pentaerythritol, aromatic polyhydric alcohols obtained by an addition reaction of ethylene oxide with bisphenol, diethylene glycol, triethylene glycol, polyethylene glycol and polypropylene glycol; hydroxycarboxylic acids such as glycolic acid, 3-hydroxybutyric acid, 4-hydroxybutyric acid, 4-hydroxyvaleric acid and 6-hydroxycaproic acid; and lactones such as glycolide, ε-caprolactoneglycolide, ε-caprolactone, β-propiolactone, δ-butyrolactone, β- or γ-butyrolactone, pivalolactone and δ-valerolactone.

The polyalkylene terephthalate used in the present invention is preferably a polymer or copolymer obtained by polymerizing terephthalic acid or an ester-forming derivative thereof with a diol or an ester-forming derivative thereof. It is possible to use, as the diol or ester-forming derivative thereof, the same aliphatic glycols as those used in the aliphatic polyester. The polyalkylene terephthalate may include a dicarboxylic acid unit except for a terephthalic acid unit as long as performances are not impaired. Examples of the dicarboxylic acid unit include the same aliphatic dicarboxylic acid unit as that used in the aliphatic polyester; and aromatic dicarboxylic acid units of isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyletherdicarboxylic acid, 5-tetrabutylphosphoniumisophthalic acid, 5-sodiumsulfoisophthalic acid and the like.

Examples of the polyalkylene terephthalate include polyethylene terephthalate, polypropylene terephthalate, polybutylene terephthalate, polycyclohexanedimethylene terephthalate, polyethylene isophthalate/terephthalate, polybutylene isophthalate/terephthalate, polyethylene terephthalate/naphthalate, polybutylene terephthalate/naphthalate and the like. Polyethylene terephthalate and polybutylene terephthalate are more preferred.

Among these aliphatic polyesters or polyalkylene terephthalates, for example, polyethylene terephthalate, polypropylene terephthalate, polybutylene terephthalate, polyglycolic acid and polylactic acid are preferably used. Polyethylene terephthalate, polybutylene terephthalate and polylactic acid are more preferred, and polylactic acid is particularly preferred.

The polyester which is subjected to the crystallization step in the present invention preferably has an inherent viscosity, measured in an o-chlorophenol solution at 25° C., within a range from 0.20 to 1.60 dl/g, more preferably from 0.30 to 1.25 dl/g, and particularly preferably from 0.4 to 0.8 dl/g. Particularly in case of the aliphatic polyester, the inherent viscosity is preferably within a range from 0.3 to 1.00 dl/g.

The polyester which is subjected to the crystallization step in the present invention preferably has a weight average molecular weight (hereinafter also referred to as Mw) within a range from 5,000 to 100,000, and more preferably from 7,000 to 80,000. From the viewpoint of a relation between the crystallinity and the fluidity of the obtained crystallized polyester, when the polyester is the aliphatic polyester, the weight average molecular weight is preferably within a range from 10,000 to 60,000. When the aliphatic polyester is polylactic acid, the weight average molecular weight is particularly preferably within a range from 10,000 to 40,000. When the polyester is polyalkylene terephthalate, particularly polyethylene terephthalate or polybutylene terephthalate, the weight average molecular weight is preferably within a range from 7,000 to 20,000. It is not preferred that the weight average molecular weight is less than 5,000 since the mechanical strength is low. It is not preferred that the weight average molecular weight is more than 100,000 since the fluidity is low and, particularly, when the crystallinity becomes 10% or more, the fluidity drastically decreases.

In case of the aliphatic polyester, the polymer having the weight average molecular weight within a range from about 5,000 to 60,000 may be sometimes referred to as an oligomer or a prepolymer. In case of the polyalkylene terephthalate, the polymer having the weight average molecular weight within a range from about 5,000 to 25,000 may be sometimes referred to as an oligomer or a prepolymer. As described above, in the prior art, it was difficult to use the polymer having the molecular weight within the above range since it has a problem with melt processability. However, it is possible to use when the method of the present invention is used.

In the present invention, the weight average molecular weight of the polyester is preferably a standard polymethyl methacrylate equivalent weight average molecular weight measured by gel permeation chromatography (GPC) using hexafluoroisopropanol as a solvent.

There is no particular limitation on the polymerization method of the aliphatic polyester or polyalkylene terephthalate used in the present invention, and a known polycondensation method, a ring-opening polymerization method and the like can be used. The polymerization method may be either a batch polymerization method or a continuous polymerization method, and can be applied in any of an ester exchange reaction and a reaction by direct polymerization. The continuous polymerization method is preferred since it can decrease the amount of a carboxyl end group and also the effect of improving fluidity and hydrolysis resistance is enhanced. It is preferred that a melt polymerization reaction is performed under an inert gas atmosphere, under a flow gas atmosphere and/or under reduced pressure. There is no limitation on the temperature of the polymerization reaction as long as the progress of a dehydration polycondensation reaction can be maintained. Specifically, the reaction is preferably performed at a temperature within a range of a melting point or higher of a polymer existing in the reaction system and a melting point+70° C. or lower taking a formation rate and a rate of thermal decomposition of the polyester into consideration. Among the temperature range, a temperature within a range of a melting point or higher and a melting point+50° C. or lower is preferred. It is also possible to use an apparatus composed of a plurality of reaction vessels in the polymerization step. In that case, it is preferred to produce by supplying a reaction solution containing a melted raw material and, optionally, a catalyst to an apparatus composed of two or more reaction vessels disposed in series, and sequentially supplying the reaction solution to the subsequent reaction vessel while heating. In this case, the number of the reaction vessel included in the reaction apparatus may be two or more, and preferably three or more.

Examples of the polymerization catalyst include a metal catalyst and an acid catalyst. Examples of the metal catalyst include a tin compound, a titanium compound, a lead compound, a zinc compound, a cobalt compound, an iron compound, a lithium compound, a rare earth compound, an aluminum compound, a zirconium compound, an antimony compound and the like. Examples of the compound include a metal alkoxide, a metal halide, an organic carboxylate, a carbonate, a sulfate, an oxide and the like.

Specific examples thereof include tin compounds such as a tin powder, tin (II) chloride, tin (II) acetate, tin (IV) acetate, tin (II) octylate, acetylacetone tin (II), tin (II) oxalate, tin (II) lactate, tin (II) bis(methanesulfonate), tin (II) oxide, tin (IV) oxide, tin (II) trifluoromethanesulfonate, and monobutyltin oxide.

Examples thereof further include titanium compounds such as titanium isopropoxide, titanium butoxide and titanium isobutoxide; zinc compounds such as zinc acetate; cobalt compounds such as cobalt chloride, cobalt acetate and cobalt (II) oxide; iron compounds such as iron (II) chloride, iron (II) acetate and iron (II) octylate; rare earth compounds such as lanthanum acetate and yttrium triacetate; copper compounds such as copper (II) chloride and copper (II) acetate; nickel compounds such as nickel acetate and nickel octylate; zirconium compounds such as tetraisopropoxy zirconium (IV), zirconium trichloride and zirconium acetate; antimony compounds such as antimony (III) oxide; magnesium compounds such as magnesium lactate and magnesium carbonate; calcium compounds such as calcium acetate and calcium lactate; aluminum compounds such as aluminum isopropoxide; germanium compounds such as germanium (IV) oxide; and the like. Compounds composed of two or more kinds of metal elements, such as sodium stannate, magnesium stannate, sodium titanate, magnesium titanate and aluminum titanate are also preferred.

The acid catalyst may be Broensted acid as a proton donor, or Lewis acid as an electron-pair acceptor, or either an organic acid or an inorganic acid. There is no limitation on the structure of the acid catalyst, and the acid catalyst may be either a solid acid catalyst or a liquid acid catalyst. Examples thereof include aromatic sulfonic acids such as benzenesulfonic acid, 2,5-dimethylbenzenesulfonic acid, aminobenzenesulfonic acid, 3-amino-4-hydroxybenzenesulfonic acid, p-phenolsulfonic acid, p-toluenesulfonic acid, naphthalenesulfonic acid, naphthalenedisulfonic acid, 4,4-biphenyldisulfonic acid, benzenedisulfonic acid and aniline-2,4-disulfonic acid; aliphatic sulfonic acids such as methanesulfonic acid, ethanesulfonic acid, 1-propanesulfonic acid, trifluoromethanesulfonic acid, 1,2-ethanedisulfonic acid, 1,3-propanedisulfonic acid and taurine; sulfonic acid compounds, for example, alicyclic sulfonic acids such as cyclopentanesulfonic acid, cyclohexanesulfonic acid and camphorsulfonic acid; phosphoric acid, metaphosphoric acid, phosphorous acid, hypophosphorous acid, polyphosphoric acid, and phosphoric acid monoesters such as monododecyl phosphate and monoctadecyl phosphate; phosphoric acid diesters such as didodecyl phosphate and dioctadecyl phosphate; phosphoric acid compounds such as phosphorous acid monoester and phosphorous acid diester; boric acid, sulfuric acid and the like.

Examples of the solid acid catalyst include natural minerals such as acid clay, zirconium silicate and zeolite; oxides such as silica, alumina, titania and zirconia; oxide complexes such as silica alumina, silica magnesia, silica titania and silica zirconia; fluorinated alumina, cation-exchange resin and the like.

In case of polylactic acid, poly-L-lactic acid and poly-D-lactic acid can be simultaneously produced, respectively, by using a catalyst having an ability of stereoselective polymerization and using an equivalent mixture of L-lactic acid and D-lactic acid as a raw material.

Tin compounds, titanium compounds, lead compounds, zinc compounds, cobalt compounds, iron compounds, lithium compounds, rare earth compounds, antimony compounds, bismuth compounds, aluminum compounds and acid catalysts are preferred since they are excellent in polymerizability and a high molecular weight polyester can be obtained. Tin compounds, titanium compounds, zinc compounds, iron compounds, rare earth compounds, antimony compounds, sulfonic acid compounds and phosphorus compounds are more preferred from the viewpoint of excellent productivity.

Among these, when the aliphatic polyester, particularly polylactic acid is produced, tin compounds, titanium compounds, rare earth compounds, sulfonic acid compounds and phosphorus compounds are more preferred. Since an aliphatic polyester resin, which is also excellent in thermal stability and hue, can be obtained, a tin-based organic carboxylate having two ligands is preferred as the metal catalyst. Tin (II) acetate or tin (II) octylate is particularly preferred. Monosulfonic acid or disulfonic acid is preferred as the acid catalyst, and methanesulfonic acid, ethanesulfonic acid, p-toluenesulfonic acid, propanedisulfonic acid, taurine and naphthalenedisulfonic acid are particularly preferred. The catalyst may be used alone, or two or more kinds of catalysts may be used in combination. It is more preferred to use one or more kinds selected from tin compounds and one or more kinds selected from sulfonic acid compounds. Since a polyester, which is also excellent in thermal stability and hue, can be obtained, it is more preferred to use tin (II) acetate and/or tin (II) octylate, and any one or more kinds of sulfonic acid compounds selected from methanesulfonic acid, ethanesulfonic acid, propanedisulfonic acid, taurine and naphthalenedisulfonic acid. It is particularly preferred to use tin (II) acetate and/or tin (II) octylate, and methanesulfonic acid.

The amount of the catalyst is preferably from 0.001 to 2 parts by weight, and more preferably from 0.001 to 1 part by weight, based on 100 parts by weight of the raw material used, since a polyester having a high molecular weight and a high melting point can be efficiently obtained by polymerization. Since a polyester, which is also excellent in thermal stability and hue, can be obtained, the amount of the catalyst is more preferably from 0.001 to 0.5 part by weight, and particularly preferably from 0.01 to 0.3 part by weight. When two or more kinds of catalysts are used in combination, the total amount is preferably within the above range.

When metal compounds and sulfonic acid compounds are used in combination, a weight ratio of both compounds is preferably within a range from 30:1 to 1:30, and more preferably from 10:1 to 1:10.

It is also preferred to mix the crystallized polyester of the present invention with the other resin except for the polyester while the polyester maintains fluidity. There is no limitation on the mixing method and, it is preferred to use the method in which the other resin is supplied from a side feeder disposed at a downstream side of the crystallization step, followed by mixing when the melting machine is an extruder. Examples of the other resin to be mixed include a polyethylene resin, a polypropylene resin, a polymethylpentene resin, a cyclic olefinic resin, an acrylic resin such as polymethyl methacrylate, an acrylonitrile-butanediene-styrene (ABS) resin, an acrylonitrile-styrene (AS) resin, a cellulose-based resin such as cellulose acetate, a polyamide resin, a polyacetal resin, a polycarbonate resin, a polyphenylene ether resin, a polyallylate resin, a polysulfone resin, a polyphenylene sulfide resin, a polyethersulfone resin, a polyether ether ketone resin, a polyimide resin, a polyetherimide resin and the like. A polymer, which is easily compatible with the crystallized polyester, is preferred. Specifically, an acrylic resin such as polymethyl methacrylate, a polyacetal resin, and a polymer having an epoxy group, a hydroxyl group, a carboxyl group, an oxazoline group, an isocyanate group, and a functional group derived therefrom are preferably used.

Since a phase separation structure of the mixture prepared by mixing the crystallized polyester with the other resin using this technique is controlled, it has satisfactory processability and ability of solid phase polymerization. It is possible to form a polymer alloy or copolymer having excellent characteristics by cooling and solidifying the mixture and then performing solid phase polymerization. The additive amount of the other resin other than the polyester is preferably from 1 to 1,000 parts by weight, and more preferably from 5 to 500 parts by weight, based on 100 parts by weight of the polyester When the polyester to be subjected to the crystallization step of the present invention is polylactic acid, and also poly-L-lactic acid and poly-D-lactic acid are mixed, poly-L-lactic acid or poly-D-lactic acid as the raw material is converted into a state having a crystallinity of 10% or more and fluidity by the crystallization step, and then poly-D-lactic acid is mixed when the polyester is poly-L-lactic acid, while poly-L-lactic acid is mixed when the polyester is poly-D-lactic acid. In other words, any one of poly-L-lactic acid and poly-D-lactic acid is crystallized by the method of the present invention, and then the other one is mixed. There is no limitation on the method in which poly-D-lactic acid or poly-L-lactic acid at the downstream is mixed. When the melting machine is an extruder, a method in which poly-D-lactic acid or poly-L- lactic acid is supplied from a side feeder disposed at a downstream side of the crystallization step, followed by mixing is preferred.

The present technique is particularly preferred from the viewpoint of capability of controlling a crystallization state and a stereocomplex formation rate of a mixture of poly-L-lactic acid and poly-D-lactic acid after mixing. Usually, when poly-L-lactic acid and poly-D-lactic acid are melt-mixed, a rigid stereocomplex is formed and thus a molecular motion is limited and a polymer having sufficiently high molecular weight may not be easily obtained even if subjected to solid phase polymerization. However, when poly-L-lactic acid and poly-D-lactic acid are mixed by the present technique, the stereocomplex ratio can be decreased. This reason is considered as follows. According to the present technique, poly-L-lactic acid or poly-D-lactic acid supplied first are in a crystallized state while maintaining the fluidity by the crystallization step, and is mixed with poly-D-lactic acid or poly-L-lactic acid at the downstream while maintaining the state. Therefore, it is considered that poly-L-lactic acid and poly-D-lactic acid are not mixed together so as to form a rigid stereocomplex as compared with the case of both compounds are mixed in a molten state. Therefore, a mixture of this aspect is characterized by having a high molecular mobility and excellent reactivity of solid phase polymerization as compared with the mixture which formed the rigid stereocomplex.

Herein, after the crystallization step, when a crystal structure was frozen by quenching poly-L-lactic acid or poly-D-lactic acid before mixing using ice water or liquid nitrogen, and then the measurement was performed at temperature rise using a differential scanning calorimeter, it is preferred to satisfy the following inequality expression:

$$(\Delta Hm - \Delta Hc) > 20 \ (J/g) \quad (1).$$

where $\Delta Hm$ (J/g) denotes a heat of crystal melting, and $\Delta Hc$ (J/g) denotes a heat of crystallization upon temperature increase.

The stereocomplex ratio of the obtained mixture can be calculated by the following equation (2):

$$Sc = \Delta Hh / (\Delta Hl + \Delta Hh) \times 100 (\%) \quad (2)$$

where $\Delta Hl$ denotes a heat based on crystal melting of a crystal of poly-L-lactic acid alone and a crystal of poly-D-lactic acid alone observed at a low temperature side in case of measuring using a differential scanning calorimeter, and $\Delta Hh$ denotes a calorie based on crystal melting of a stereocomplex crystal observed at a high temperature side in case of measuring using a differential scanning calorimeter.

The thus produced crystallized polyester can be cooled and solidifies, and then subjected to the subsequent step. There is no particular limitation on the shape of the cooled and solidified crystallized polyester, and the shape may be any shape of a film, a pellet, a molded article, a powder and the like. From the viewpoint of capability of efficiently making a progress of the solid phase polymerization, the crystallized polyester is preferably pelletized.

Examples of the pelletizing method include a method in which the crystallized polyester is ejected through a melting machine, and then cooled and solidified and simultaneously pelletized by an underwater cutter or a hot cutter. It is also possible that the crystallized polyester ejected through the melting machine into a strand shape, cooled and solidified, and then pelletized by a strand cutter. There is also exemplified a method in which the crystallized polyester is dropped in the form of a droplet from a melting machine using a drop nozzle, brought into contact with a gas or liquid, cooled and solidified, and then pelletized. It is also possible to obtain pellets by solidifying the crystallized polyester to form a powder, and then compression-molding the obtained powder. From the viewpoint of uniformity of crystallinity in the pellets, it is preferred to directly pelletize. The size of the pellet is preferably from 1 mm or more and 10 mm or less, and more preferably 1.5 mm or more and 6 mm or less.

Examples of the method of forming into a powder include a method in which the crystallized polyester is cooled and solidified, and then crushed using a mixer, a blender, a ball mill and a hammer crusher, and a method in which the crystallized polyester is simultaneously solidified and crushed in a melt kneader. From the viewpoint of capability of efficiently subjecting to solid phase polymerization, the powder preferably has an average particle diameter of 0.01 to 3 mm, and more preferably 0.1 to 2 mm.

Among these methods, a method of pelletizing using an underwater cutter or a hot cutter is preferably used, and particularly preferably an underwater cutter. In case of using the underwater cutter, temperature distribution in a die portion is preferably adjusted within 25° C., more preferably within 10° C., and particularly preferably within 5° C., from the viewpoint of capability of obtaining pellets having a uniform shape. There is no particular limitation on the method of heating dies for an underwater cutter, and heat medium heating type, electrothermal heater heating type, induction heating type and the like can be used. From the viewpoint of temperature distribution, a heat medium heating type is preferred. From the viewpoint of preventing mutual adhesion of pellets, a circulating liquid temperature is preferably adjusted within a range of a glass transition temperature of the polyester to be used +50° C. or lower, more preferably, a glass transition temperature +20° C. or lower, and particularly preferably a glass transition temperature or lower.

The thus obtained pellet may be further subjected to solid phase polymerization. The solid phase polymerization step is the step of increasing the molecular weight of the polyester at a temperature which is lower than a melting point of the polyester. From the viewpoint of capability of efficiently obtaining a polyester which has a high molecular weight and a high melting point and also has excellent hue, the solid phase polymerization is preferably performed at a temperature of a glass transition temperature or higher and lower than a melting point, more preferably at a temperature of a glass transition temperature +10° C. or higher and a melting point −5° C. or lower, and still more preferably at a temperature of a glass transition temperature +20° C. or higher and a melting point of −10° C. or lower. The temperature of the solid phase polymerization step may be controlled at either a single stage or a multi-stage. Since the molecular weight is easily increased within a short time and also hue is excellent, the temperature is preferably controlled at two-stage or multi-stage and, more preferably, the temperature is raised stepwise or continuously with the progress of the reaction.

It is preferred that crystallization treatment or preliminary solid phase polymerization is performed under an inert gas atmosphere or under reduced pressure at 100 to 130° C. for 0.5 to 3 hours so as to enhance crystallinity before the solid phase polymerization since a satisfactory solid phase polymerization reaction proceeds.

From the viewpoint of capability of efficiently obtaining a polyester resin which has a high molecular weight and a high melting point and also has thermal stability and hue, the reaction time of the solid phase polymerization step is preferably from 1 to 100 hours, more preferably from 3 to 80 hours, still more preferably from 4 to 50 hours, and further preferably from 6 to 30 hours.

When the temperature of the solid phase polymerization step is controlled at a two-stage or a multi-stage, for example, in case of polylactic acid, there is exemplified a method in which the solid phase polymerization step is controlled at a first stage (at a temperature of 120 to 140° for 1 to 50 hours) and a second stage (at a temperature of 140 to 160° C. for 1 to 50 hours). Since the molecular weight is easily increased within a short time and also hue is excellent, it is more preferred that the solid phase polymerization step is controlled at a first stage (at a temperature of 120 to 140° for 5 to 20 hours), a second stage (at a temperature of 140 to 150° C. for 5 to 20 hours) and a third stage (at a temperature of 150 to 160° C. for 10 to 30 hours). Even when the solid phase polymerization step is controlled at a temperature at a two-stage or a multi-stage, the total of the reaction time of the solid phase polymerization step is preferably from 1 to 100 hours.

There is no particular limitation on the pressure condition in the solid phase polymerization step, and he solid phase polymerization step may be performed under any of reduced pressure, normal pressure and high pressure. From the viewpoint of capability of efficiently obtaining a polymer having a high molecular weight, the reduced pressure condition or normal pressure condition is preferred. When the solid phase polymerization step is controlled under reduced pressure condition, the pressure is preferably from 0.13 to 1,300 Pa. From the viewpoint of capability of efficiently obtaining a polymer which is also excellent in hue, the pressure is preferably from 1 to 1,000 Pa, more preferably from 10 to 900 Pa, still more preferably from 100 to 800 Pa, and particularly preferably from 500 to 700 Pa. The pressure of the solid phase polymerization step may be controlled at a single stage, a two-stage or a multi-stage. Since the molecular weight can be increased and hue is excellent, a two-stage or a multi-stage is preferred. For example, there is exemplified a method in which the reaction is performed under a pressure of 700 to 1,300 Pa, and then the reaction is performed under a pressure of 0.13 to 700 Pa. It is also preferred that the solid phase polymerization is performed under a flow of an inert gas such as dry nitrogen. The linear velocity of the inert gas flow is preferably 0.1 m/s or more, and more preferably 0.2 m/s or more. It is also possible that the solid phase polymerization can be performed under reduced pressure and an inert gas flow.

The solid phase polymerization step may be performed by either a batch method or a continuous method. It is possible to use, as the reaction vessel, a stirring tank type reaction vessel, a mixer type reaction vessel, a tower type reaction vessel, a kiln type reaction vessel and the like, and two or more kinds of these reaction vessels can be used in combination.

In the solid phase polymerization step, it is preferred to use an apparatus including a vaporization portion having a function of separating a volatile component and partially removing the volatile component out of the reaction system, and a condensation portion which captures the volatile component. Specifically, any apparatus can be used as long as it can removed water among the volatile component and can recover a low molecular weight polymer. Herein, examples of the condenser constituting the condensation portion include a double pipe type, multi-pipe type, coil type, plate type, plate fin type, coil type, jacket type, molecular sieve type, ion exchange type condensers and the like. It is also preferred to set the temperature of the condenser so that the low molecular weight polymer can be efficiently recovered and recycled. For example, in case of polylactic acid, the temperature of the condenser is preferably from −10° C. to 160° C., and it is also preferred to conduct at a multi-stage, for example, a first stage is performed at 80 to 120° C. and the second stage is performed at 10° C. to 80° C.

In the present invention, the preferred method is a method for producing a polyester, which includes the polymerization step of reacting a monomer of a polyester selected from an aliphatic polyester and a polyalkylene terephthalate to produce an oligomer or a prepolymer; the crystallization step of applying a shear and/or a pressure at a temperature of (Tm−70° C.) to (Tm+20° C.), where Tm is a melting point of the oligomer or prepolymer, thereby converting the polyester into a state having a crystallinity of 10% or more and fluidity; the step of cooling and solidifying, and pelletizing the obtained polyester; and the step of subjecting the obtained pellets to solid phase polymerization; in this order. The oligomer or prepolymer obtained by the polymerization step can be subjected to the crystallization step after once solidified, and it is preferred that the oligomer or prepolymer obtained by the polymerization step is directly subjected to the crystallization step without solidifying since pellets having a uniform crystallinity can be obtained.

In the present invention, it is preferred to control a rotating speed and a temperature of a melting machine in the crystallization step according to the pressure of the resin measured in the crystallization step or the pelletization step. Whereby, uniform pellets with less unevenness in crystallinity in pellets or between pellets are obtained and a polyester having excellent characteristics can be stably obtained by continuously subjecting the obtained pellets to the solid phase polymerization. Specifically, in the crystallization step, control is made corresponding to the measurement results of a pressure gauge disposed on a tip of a melting machine, for example, the temperature of the melting machine is lowered when the pressure decreases, whereas, the temperature of the melting machine is raised when the pressure increases.

There is no limitation on the apparatus which realize such a production method, and the following apparatus can be exemplified as a preferred example. Preferred is an apparatus including a reactor for reacting a monomer of a polyester selected from an aliphatic polyester and a polyalkylene terephthalate to produce an oligomer or a prepolymer; a crystallizer for crystallizing the oligomer or prepolymer; a pelletizer for pelletizing the crystallized polyester; and a solid phase polymerization reactor for solid phase polymerization of the obtained pellets. It is possible to produce a solid phase-polymerized polyester, stably and continuously, using a monomer of polyester selected from an aliphatic polyester and a polyalkylene terephthalate as a raw material by disposing these devices. The crystallizer is preferably a single- or multi-screw extruder equipped with a temperature controller. The temperature controller is a device capable of heating and/or cooling the crystallizer. At least one of the crystallizer and pelletizer includes a pressure gauge, and it is preferred to control the temperature of the crystallizer according to the pressure measured by the pressure gauge. Such a control can be performed by a method of operating by setting a sequence about a relation between the pressure and the temperature. It is preferred to use, as the pelletizer, an underwater cutter or a hot cutter. It is also possible to dispose another pelletizer between the reactor and the crystallizer.

A molded article can also be obtained by directly supplying the crystallized polyester of the present invention to a molding machine from a melting machine, and molding using a molding method selected from injection molding, injection compression, compression, extrusion molding method and the like. The thus obtained molded article is preferred since the crystallinity is higher than that of the molded article obtained by conventional method. When a low molecular weight polyester resin is molded, molding defects such as burr often occur in case of molding using a conventional molding method. On the other hand, in case of molding using the present invention, the generation of burr can be suppressed since the polyester resin has moderate melt viscosity by means of crystallization.

Examples of the molded article include a film, a sheet, a fiber, a woven fabric, a nonwoven fabric, an injection molded article, an extrusion molded article, a vacuum air-pressure molded article, a blow molded article, a complex with the other material and the like. These molded articles are useful as agricultural materials, gardening materials, fishery materials, civil engineering materials, writing materials, medical supplies, automotive components, electrical and electronic components, or other applications.

The crystallized polyester of the present invention or those obtained by solid phase polymerization of the crystallized polyester may contain a stabilizer. It is possible to improve retain stability of the polyester by adding the stabilizer. Examples of the stabilizer in the present invention include a phosphorous-based compound, a hindered phenol-based compound, a thioether-based compound, a vitamin-based compound, a triazole-based compound, a polyhydric amine-based compound, a hydrazine derivative-based compound and the like, and these compounds may be used in combination. It is preferred to contain at least one kind of a phosphorous-based compound.

Specific examples of the hindered phenol-based compound include "Adekastab (registered trademark)" AO-20, AO-30, AO-40, AO-50, AO-60, AO-70, AO-80 and AO-330 manufactured by Asahi Denka Co., Ltd.; "Irganox (registered trademark)" 245, 259, 565, 1010, 1035, 1076, 1098, 1222, 1330, 1425, 1520, 3114 and 5057 manufactured by Ciba Specialty Chemicals Inc.; "Sumilizer (registered trademark)" BHT-R, MDP-S, BBM-S, WX-R, NR, BP-76, BP-101, GA-80, GM and GS manufactured by Sumitomo Chemical Co., Ltd.; "Cyanox" CY-1790 manufactured by Cyanamid Co.; and the like.

Specific examples of the thioether-based compound include "Adekastab (registered trademark)" AO-23, AO-412S and AO-503A manufactured by Asahi Denka Co., Ltd.; "Irganox (registered trademark)" PS802 manufactured by Ciba Specialty Chemicals Inc.; "Sumilizer (registered trademark)" TPL-R, TPM, TPS and TP-D manufactured by Sumitomo Chemical Co., Ltd.; DSTP, DLTP, DLTOIB and DMTP manufactured by YOSHITOMI, LTD.; の "SEENOX (registered trademark)" 412S manufactured by SHIPRO KASEI KAISHA, LTD.; "Cyanox" 1212 manufactured by Cyanamid Co.; and the like Specific examples of the vitamin-based compound include "Tocopherol" manufactured by Eisai Co., Ltd.; "Irganox (registered trademark)" E201 manufactured by Ciba Specialty Chemicals Inc.; and the like.

Specific examples of the triazole-based compound include benzotriazole, 3-(N-salicyloyl)amino-1,2,4-triazole and the like.

Specific examples of the polyhydric amine-based compound include 3,9-bis[2-(3,5-diamino-2,4,6-triazaphenyl)ethyl]-2,4,8,10-tetraoxaspiro[5.5]undecane, ethylenediamine-tetraacetic acid, alkali metal salts (Li, Na, K) of ethylenediamine-tetraacetic acid and the like.

Specific examples of the hydrazine derivative-based compound include decamethylenedicarboxylic acid-bis(N'-salicyloylhydrazide), isophthalic acid bis(2-phenoxypropionylhydrazide), N-formyl-N'-salicyloylhydrazine and the like.

Examples of the phosphorous compound include a phosphite-based compound, a phosphate-based compound and the like. Specific examples of the phosphite-based compound include tetrakis[2-t-butyl-4-thio(2'-methyl-4'-hydroxy-5'-t-butylphenyl)-5-methylphenyl]-1,6-hexamethylene-bis(N-hydroxyethyl-N-methylsemicarbazide)-diphosphite, tetrakis[2-t-butyl-4-thio(2'-methyl-4'-hydroxy-5'-t-butylphenyl)-5-methylphenyl]-1,10-decamethylene-dicarboxylic acid-di-hydroxyethylcarbonylhydrazide-diphosphite, tetrakis[2-t-butyl-4-thio(2'-methyl-4'-hydroxy-5'-t-butylphenyl)-5-methylphenyl]-1,10-decamethylene-dicarboxylic acid-di-salicyloylhydrazide-diphosphite, tetrakis[2-t-butyl-4-thio(2'-methyl-4'-hydroxy-5'-t-butylphenyl)-5-methylphenyl]-di(hydroxyethylcarbonyl) hydrazide-diphosphite, tetrakis[2-t-butyl-4-thio(2'-methyl-4'-hydroxy-5'-t-butylphenyl)-5-methylphenyl]-N,N'-bis(hydroxyethyl) oxamide-diphosphite and the like. Those in which at least one P—O bond is linked to an aromatic group are more preferred. Specific examples thereof include tris(2,4-di-t-butylphenyl) phosphite, tetrakis(2,4-di-t-butylphenyl) 4,4'-biphenylene phosphonite, bis(2,4-di-t-butylphenyl) pentaerythritol-diphosphite, bis(2,6-di-t-butyl-4-methylphenyl)pentaerythritol-di-phosphite, 2,2-methylenebis(4,6-di-t-butylphenyl) octylphosphite, 4,4'-butylidene-bis(3-methyl-6-t-butylphenyl-di-tridecyl)phosphite, 1,1,3-tris(2-methyl-4-ditridecylphosphite-5-t-butyl-phenyl) butane, tris(mixed mono- and di-nonylphenyl)phosphite, tris(nonylphenyl)phosphite, 4,4'-isopropylidenebis(phenyl-dialkylphosphite) and the like. Tris(2,4-di-t-butylphenyl)phosphite, 2,2-methylenebis(4,6-di-t-butylphenyl) octylphosphite, bis(2,6-di-t-butyl-4-methylphenyl)pentaerythritol-di-phosphite, tetrakis(2,4-di-t-butylphenyl)-4,4'-biphenylenephosphonite and the like can be used particularly preferably. Specific examples of the trade name of the phosphite-based compound include "Adekastab (registered trademark)" PEP-4C, PEP-8, PEP-11C, PEP-24G, PEP-36, HP-10, 2112, 260, 522A, 329A, 1178, 1500, C, 135A, 3010 and TPP manufactured by Asahi Denka Co., Ltd.; "Irgafos (registered trademark)" 168 manufactured by Ciba Specialty Chemicals Inc.; "Sumilizer (registered trademark)" P-16 manufactured by Sumitomo Chemical Co., Ltd.; "Sandostab" P-EPQ manufactured by Clariant Co.; "Weston" 618, 619G and 624 manufactured by GE Co.; and the like.

Specific examples of the phosphate-based compound include monostearyl acid phosphate, distearylc acid phosphate, methyl acid phosphate, isopropyl acid phosphate, butyl acid phosphate, octyl acid phosphate, isodecyl acid phosphate and the like. Among these compounds, monostearyl acid phosphate and distearyl acid phosphate are preferred. Specific examples of the trade name of the phosphate-based compound include "Irganox (registered trademark)" MD1024 manufactured by Ciba Specialty Chemicals Inc.; "Inhibitor" OABH manufactured by Eastman Kodak Company; "Adekastab (registered trademark)" CDA-1, CDA-6 and AX-71 manufactured by Asahi Denka Co., Ltd.; "Qunox" manufactured by Mitsui Fine Chemicals, Inc.; "Naugard" XL-1 manufactured by UNIROYAL Co.; and the like The mixing proportion of the stabilizer is preferably from 0.001 to 2 parts by weight, and more preferably from 0.01 to 1 part by weight, based on 100 parts by weight of the polyester of the present invention. It is not preferred that the additive amount is less than 0.001 part by weight since sufficient heat resistant effect cannot be obtained. Also it is not preferred that the additive amount is more than 2 parts by weight since mechanical characteristics of the thermoplastic resin composition deteriorates. Also, there is no particular limitation on the addition method. Since a polyester resin with well-balanced melting point, mechanical properties and retain stability can be obtained, a method of adding during the production of the crystallized polyester of the present invention, or a method of adding during melt processing after increasing the molecular weight by solid phase polymerization is preferred.

To the crystallized polyester of the present invention or those obtained by solid phase polymerization of the crystallized polyester, a filler and the other additive can be added. There is no particular limitation on the filler, and any of fibrous, tabular, powdered and granular fillers can be used. Examples of the filler include fibrous fillers such as glass fiber, carbon fiber, potassium titanate whisker, zinc oxide whisker, calcium carbonate whisker, wollastonite whisker, aluminum borate whisker, aramid fiber, alumina fiber, silicon carbide fiber, ceramic fiber, asbestos fiber, gypsum fiber and metal fiber; silicates such as talc, wollastonite, zeolite, sericite, mica, kaolin, clay, pyrophyllite, bentonite, asbestos and alumina silicate; metal oxides such as silicate oxide, magnesium oxide, alumina, zirconium hydroxide, titanium oxide and iron oxide; carbonates such as calcium carbonate, magnesium carbonate and dolomite; sulfates such as calcium sulfate and barium sulfate; non-fibrous fillers such as hydroxide (calcium hydroxide, magnesium hydroxide, aluminum hydroxide, etc.), glass beads, ceramic beads, glass flake, glass powder, carbon black and silica and graphite; various clay minerals such as smectite-based clay mineral (montmorillonite, beidellite, nontronite, saponite, hectorite, sauconite, et.), vermiculite, halloysite, kanemite, kenyaite, zirconium phosphate and titanium phospate; layered silicates such as Li-fluor-taeniolite, Na-fluor-taeniolite, and swellable mica such as Na exchanged tetrasilicic fluoro mica or Li exchanged tetrasilicic fluoro mica; and the like. Examples of the other additive include an ultraviolet absorber, a discoloration preventing agent, a lubricant, a releasant, a coloring agent, an antistatic agent and the like.

A nucleating agent may be added so as to accelerate the crystallization. There is no particular limitation on the nucleating agent, and any of an inorganic nucleating agent and an organic nucleating agent can be used. Specific examples of the inorganic nucleating agent include talc, kaolinite, montmorillonite, synthetic mica, clay, zeolite, silica, graphite, carbon black, zinc oxide, magnesium oxide, titanium oxide, calcium sulfide, boron nitride, calcium carbonate, barium sulfate, aluminum oxide, neodymium oxide, phenyl phosphonate metal salt and the like. It is preferred that these inorganic nucleating agents are modified with an organic substance so as to enhance dispersibility in the composition. Specific examples of the organic nucleating agent include organic carboxylic acid metal salts such as sodium laurate; organic sulfonates such as sodium p-toluenesulfonate; organic carboxylic acid amides such as lauric acid amide; polymers such as low density polyethylene; ionomers; benzylidene sorbitol and a derivative thereof; phosphorus compound metal salts; and the like. The nucleating agent used in the present invention is particularly preferably at least one kind selected from talc, organic carboxylic acid metal salts and organic carboxylic acid amide among those described above. It is possible to exemplify, as preferred talc, talc having an average particle size of 0.5 to 7 μm in which the proportion of $SiO_2$ and MgO in the component excluding loss upon combustion is 93% by weight or more. These nucleating agent used in the present invention may be used alone, or two or more kinds of these nucleating agents may be used in combination.

The mixing amount of the nucleating agent is preferably within a range from 0.01 to 30 parts by weight, more preferably from 0.05 to 20 parts by weight, and still more preferably from 0.1 to 15 parts by weight, based on 100 parts by weight of the polyester of the present invention.

For the purpose of facilitating the movement by making the polymer flexible and accelerating the growth of a crystal, a plasticizer may be added. Examples of the plasticizer include a polyester-based plasticizer, a glycerin-based plasticizer, a polyhydric carboxylic acid ester-based plasticizer, a phosphoric acid ester-based plasticizer, a polyalkylene glycol-based plasticizer, an epoxy-based plasticizer and the like. Specific examples of the polyester-based plasticizer include polyesters composed of acid components such as adipic acid, sebacic acid, terephthalic acid, isophthalic acid, naphthalenedicarboxylic acid and diphenyldicarboxylic acid, and diol components such as propylene glycol, 1,3-butanediol, 1,4-butanediol, 1,6-hexanediol, ethylene glycol and diethylene glycol; polyesters composed of hydroxycarboxylic acid, such as polycaprolactone; and the like. These polyesters may be end-blocked with a monofunctional carboxylic acid or a monofunctional alcohol, or may be end-blocked with an epoxy compound. Specific examples of the glycerin-based plasticizer include glycerin monoacetomonolaurate, glycerin diacetomonolaurate, glycerin monoacetomonostearate, glycerin diacetomonooleate, glycerin monoacetomonomontanate and the like. Specific examples of the polyhydric carboxylic acid-based plasticizer include phthalic acid esters such as dimethyl phthalate, diethyl phthalate, dibutyl phthalate and dioctyl phthalate; trimellitic acid esters such as tributyl trimellitate, trioctyl trimellitate and trihexyl trimellitate; adipic acid esters such as diisodecyl adipate and adipic acid n-octyl-n-decyladipic acid ester; and the like. Specific examples of the phosphoric acid ester-based plasticizer include phosphoric acid esters such as tributyl phosphate, tri-2-ethylhexyl phosphate, trioctyl phosphate, triphenyl phosphate, diphenyl-2-ethylhexyl phosphate and tricresyl phosphate; and aliphatic or aromatic condensed phosphoric acid esters. Specific examples of the polyalkylene glycol-based plasticizer include polyethylene glycol, polypropylene glycol, a poly (ethylene oxide-propylene oxide) block and/or random copolymer, polytetramethylene glycol, an ethylene oxide addition polymer of bisphenols, a propylene oxide addition polymer of bisphenols, a tetrahydrofuran addition polymer of bisphenols, or end-blocked compounds thereof. The epoxy-based plasticizer generally means epoxytriglyceride composed of an alkyl epoxystearate and soybean oil, and so-called epoxy resin can also be used. The other plasticizer can also be used. It is also possible to usefully use, as the plasticizer, those obtained by block or graft copolymerization of the above plasticizer with polylactic acid.

Among the plasticizers described above, at least one kind selected from a polyester-based plasticizer and a polyalkylene glycol-based plasticizer is particularly preferred as the plasticizer used in the present invention. It is also possible to preferably use a copolymer of polylactic acid and an aliphatic polyester-based plasticizer, or a copolymer of polylactic acid and a polyalkylene glycol-based plasticizer. The plasticizer used in the present invention may be used alone, or two or more kinds of these plasticizers may be used in combination. The mixing amount of the plasticizer is preferably within a range from 0.01 to 30 parts by weight, more preferably from 0.1 to 20 parts by weight, still more preferably from 0.5 to 10 parts by weight, and particularly preferably from 1 to 5 parts by weight, based on 100 parts by weight of the polyester of the present invention.

For the purpose of imparting flame retardancy to the polyester of the present invention, a flame retardant may be added. It is possible to use, as the flame retardant, non-halogen-based flame retardants having no halogen atom, such as a phosphorous-based flame retardant, a nitrogen-based flame retardant and magnesium hydroxide; and halogen-based flame retardants typified by a bromine-based flame retardant. These flame retardant may be used alone, a plurality of flame retardants may be used in combination. The additive amount of the flame retardant is preferably from 1 to 150 parts by weight, more preferably from 3 to 100 parts by weight, still more preferably from 5 to 70 parts by weight, and further preferably from 5 to 50 parts by weight, based on 100 parts by weight of the polyester. When the additive amount is less than 1 part by weight, flame retardancy may be inferior. When the additive amount is more than 150 parts by weight, the fluidity decreases and also flame retardancy may rather deteriorate.

Examples of the phosphorous-based flame retardant include polyphosphoric acid-based compounds such as red phosphorus, polyphosphoric acid ammonium and polyphosphoric acid melamine; aromatic phosphate-based compounds; aromatic bisphosphate-based compound; and the like. Examples of the nitrogen-based flame retardant include a salt of a triazine-based compound with cyanuric acid or isocyanuric acid. The salt with cyanuric acid or isocyanuric acid is an adduct of cyanuric acid or isocyanuric acid with the triazine-based compound, and is usually an adduct with the composition of 1:1 (molar ratio), and optionally 1:2 (molar ratio). Among the triazine-based compound, melamine, benzoguanamine and acetoguanamine are particularly preferred. There is no particular limitation on magnesium hydroxide, and magnesium hydroxide having a particle diameter of 0.1 to 20 μm, a specific surface area of 3 to 75 $m^2/g$ and a spherical, needle-shaped or small tabular shape is preferred. Examples of the bromine-based flame retardant include monomer-based organic bromine compounds such as hexabromobenzene, pentabromotoluene, hexabromobiphenyl, decabromobiphenyl, hexabromocyclodecane, decabromodiphenylether, octabromodiphenylether, hexabromodiphenylether, bis(pentabromophenoxy)ethane, ethylene-bis(tetrabromophthalimide) and tetrabromobisphenol A; and polymer-based bromine compounds such as brominated polycarbonate and a brominated epoxy compound. Among these compounds, ethylenebis(tetrabromophthalimide), brominated epoxy polymer, brominated polystyrene, crosslinked brominated polystyrene, brominated polyphenylene ether and brominated polycarbonate can be preferably used, and brominated polystyrene, crosslinked brominated polystyrene, brominated polyphenylene ether and brominated polycarbonate can be used most preferably.

It is preferred to add a flame-retardant auxiliary which is used to synergically improve flame retardancy by using in combination with the above bromine-based flame retardant. Examples thereof include antimony trioxide, antimony pentoxide, antimony tetraoxide, hexaantimony tridecaoxide, crystalline antimonic acid, sodium antimonate, lithium antimonate, barium antimonate, antimony phosphate, zinc borate, zinc stannate, basic zinc molybdate, calcium zinc molybdate, molybdenum oxide, zirconium hydroxide, zinc oxide, iron oxide, red phosphorus, expandable graphite, carbon black and the like. Among these compounds, antimony trioxide and antimony pentoxide are more preferred. The mixing amount of the flame-retardant auxiliary is preferably from 0.2 to 30 parts by weight based on 100 parts by weight of the polyester of the present invention, from the viewpoint of the flame retardancy improving effect.

The polymer other than the polyester may be added to form a polymer alloy. Examples of the polymer other than the polyester include a polyethylene resin, a polypropylene resin, a polymethylpentene resin, a cyclic olefinic resin, an acrylic resin such as polymethyl methacrylate, an acrylonitrile-butanediene-styrene (ABS) resin, a acrylonitrile-styrene (AS) resin, a cellulose-based resin such as cellulose acetate, a polyamide resin, a polyacetal resin, a polycarbonate resin, a polyphenylene ether resin, a polyallylate resin, a polysulfone resin, a polyphenylene sulfide resin, a polyethersulfone resin, a polyether ether ketone resin, a polyimide resin, ad polyetherimide resin and the like. The additive amount of the other polymer except for the polyester is from 1 to 1,000 parts by weight, and preferably from 5 to 500 parts by weight, based on 100 parts by weight of the polyester.

EXAMPLES

The present invention will be described in more detail by way of example, but the present invention is not limited only to the following examples.

Reference Example 1

In a reaction vessel equipped with a stirrer and a refluxer, 100 parts of an aqueous 90% L-lactic acid solution was charged and the temperature was adjusted to 150° C. The pressure was gradually reduced to 800 Pa and the solution was reacted for 3.5 hours while removing water, and then 0.08 part of tin (II) acetate and 0.22 part of methanesulfonic acid were added as catalysts and the polymerization reaction was performed at a temperature of 170° C. under a pressure of 400 Pa for 6 hours to obtain poly-L-lactic acid (PLA-1) having a melting point of 151° C. and Mw of 23,000.

Reference Example 2

PLA-1 obtained in Reference Example 1 was subjected to a crystallization treatment under nitrogen at 110° C. for 1 hour and then subjected to solid phase polymerization under a pressure of 50 Pa at 140° C. for 3 hours, at 150° C. for 3 hours, then at 160° C. for 9 hours to obtain poly-L-lactic acid (PLA-2) having a melting point of 165° C. and Mw of 85,000.

Reference Example 3

PLA-1 obtained in Reference Example 1 was subjected to a crystallization treatment under nitrogen at 110° C. for 1 hour and then subjected to solid phase polymerization under a pressure of 50 Pa at 140° C. for 3 hours, at 150° C. for 3 hours, then at 160° C. for 12 hours to obtain poly-L-lactic acid (PLA-3) having a melting point of 169° C. and Mw of 105,000.

Reference Example 4

In a reaction vessel equipped with a stirrer and a refluxer, 100 parts of an aqueous 90% L-lactic acid solution was charged and the temperature was adjusted to 150° C. The pressure was gradually reduced to 800 Pa and the solution was reacted for 3.5 hours while removing water, and then 0.04 part of tin (II) acetate and 0.10 part of methanesulfonic acid as catalysts were added and the polymerization reaction was performed at a temperature of 170° C. under a pressure of 400 Pa for 6 hours to obtain poly-L-lactic acid (PLA-4) having a melting point of 145° C. and Mw of 11,000.

Reference Example 5

In a reaction vessel equipped with a stirrer and a refluxer, 100 parts of an aqueous 90% L-lactic acid solution was charged and the temperature was adjusted to 150° C. The pressure was gradually reduced to 800 Pa and the solution was reacted for 3.5 hours while removing water, and then 0.04 part of tin (II) acetate and 0.06 part of methanesulfonic acid as catalysts were added and the polymerization reaction was performed at a temperature of 170° C. under a pressure of 400

Pa for 5 hours to obtain poly-L-lactic acid (PLA-5) having a melting point of 139° C. and Mw of 4,800.

Reference Example 6

In a reaction vessel equipped with a stirrer and a refluxer, 50 parts of an aqueous 90% L-lactic acid solution was charged and the temperature was adjusted to 150° C. The pressure was gradually reduced pressure and the solution was reacted 3.5 hours while distilling off water. Thereafter, the pressure was adjusted to a normal pressure under a nitrogen atmosphere and 0.05 part of tin (II) acetate as a catalyst was added, and then polymerization reaction was performed for 7 hours while gradually reducing the pressure to 13 Pa at 170° C. to obtain poly-L-lactic acid (PLA-6). PLA-6 had a weight average molecular weight of 18,000 and a melting point of 149° C.

Reference Example 7

PLA-6 obtained in Reference Example 6 was subjected to a crystallization treatment under a nitrogen atmosphere at 110° C. for 1 hour and then subjected to solid phase polymerization under a pressure of 60 Pa at 140° C. for 3 hours, at 150° C. for 3 hours, then at 160° C. for 6 hours to obtain poly-L-lactic acid (PLA-7). PLA-7 had a weight average molecular weight of 52,000 and a melting point of 160° C.

Reference Example 8

PLA-6 obtained in Reference Example 6 was subjected to a crystallization treatment under a nitrogen atmosphere at 110° C. for 1 hour and then subjected to solid phase polymerization under a pressure of 60 Pa at 140° C. for 3 hours, at 150° C. for 3 hours, then at 160° C. for 9 hours to obtain poly-L-lactic acid (PLA-8). PLA-8 had a weight average molecular weight of 84,000 and a melting point of 170° C.

Reference Example 9

In a reaction vessel equipped with a stirrer and a refluxer, 50 parts of an aqueous 90% L-lactic acid solution was charged and the temperature was adjusted to 150° C. The pressure was gradually reduced pressure and the solution was reacted 3.5 hours while distilling off water. Thereafter, the pressure was adjusted to a normal pressure under a nitrogen atmosphere and 0.05 part of tin (II) acetate as a catalyst was added, and then polymerization reaction was performed for 7 hours while gradually reducing the pressure to 13 Pa at 170° C. to obtain poly-D-lactic acid (PDA-1). PDA-1 had a weight average molecular weight of 15,000 and a melting point of 148° C.

Reference Example 10

PDA-1 obtained in Reference Example 9 was subjected to a crystallization treatment under a nitrogen atmosphere at 110° C. for 1 hour and then subjected to solid phase polymerization under a pressure of 60 Pa at 140° C. for 3 hours, at 150° C. for 3 hours, then at 160° C. for 6 hours to obtain poly-D-lactic acid (PDA-2). PDA-2 had a weight average molecular weight of 49,000 and a melting point of 158° C.

Reference Example 11

PDA-1 obtained in Reference Example 9 was subjected to a crystallization treatment under a nitrogen atmosphere at 110° C. for 1 hour and then subjected to solid phase polymerization under a pressure of 60 Pa at 140° C. for 3 hours, at 150° C. for 3 hours, then at 160° C. for 9 hours to obtain poly-D-lactic acid (PDA-3). PDA-3 had a weight average molecular weight of 81,000 and a melting point of 167° C.

(1) On-Line Melt Viscosity

In an extruder, an on-line melt viscosity is the value measured after introducing a polymer at the temperature under the shear rate and the pressure described in each table into an on-line rheometer disposed in the extruder.

(2) Melt Viscosity

Using pellets obtained by pelletizing using an underwater cutter through the crystallization step and using Rheometer MCR501 manufactured by Anton Paar, the temperature and the shear rate were set at values described in each table and then each melt viscosity was measured by a parallel plate having a diameter of 25 mm at a gap distance of 1 mm using a rotation method. The flow rate at a predetermined temperature under a predetermined shear rate was confirmed for 3 minutes and the value was regarded as a melt viscosity.

(3) Polymer Turbidity

The polymer turbidity is a turbidity state of a polymer, visually observed from an extruder vent port according to the following criteria. The larger turbidity shows that crystallization proceeds.

A: white opaque, a screw surface is not entirely observed
B: white turbidity, a screw surface is dimply observed
C: transparent, a screw surface of an extruder is clearly observed (4) Crystallinity After freezing a crystal structure by cooling a polymer crystallized through the crystallization step while maintaining fluidity in an ice bath, wide angle x-ray diffraction measurement was performed and crystallinity was measured by an area ratio of a halo region of the amorphous portion to a diffraction peak region of the crystal portion. With respect to an injection molded article, measuring samples were cut out from the molded article and then the measurement was directly made.

(5) Measurement of Differential Scanning Calorimetry

After freezing a crystal structure by cooling a polymer crystallized through the crystallization step while maintaining fluidity in an ice bath, differential scanning calorimetry analysis of about 5 mg of a sample was performed in a nitrogen atmosphere at a temperature increasing rate of 20° C./minute using Q200 manufactured by TA Instruments in a first run in which the temperature of the polyester was increased within a range from 30° C. to 200° C. when the polyester is poly-L-lactic acid or poly-D-lactic acid, or the temperature of the polyester was raised within a range from 30° C. to 280° C. when the polyester is polyethylene terephthalate or polyethylene terephthalate/isophthalate. Using the obtained crystallization enthalpy ($\Delta Hc$) upon temperature increase and crystal melting enthalpy ($\Delta Hm$), a degree of crystallization was determined by the following formula (1). With respect to an injection molded article, measuring samples were cut out from the molded article and then the measurement was directly made.

$$[(\Delta Hm - \Delta Hc)/\Delta Hm] \times 100 \qquad (1)$$

where $\Delta Hm$ denotes crystal melting enthalpy of a molded article, and $\Delta Hc$ denotes crystallization enthalpy upon temperature increase of a molded article (6) Weight Average Molecular Weight (Mw)

The weight average molecular weight of the present invention is the value of the weight average molecular weight calculated from standard polymethyl methacrylate equivalent molecular weight distribution which is obtained by measuring using gel permeation chromatography (GPC). GPC was measured using a differential refractometer WATERS410 manufactured by WATERS as a detector, high-performance liquid chromatography MODEL 510 as a pump, and Shodex GPC HFIP-806M and Shodex GPC HFIP-LG connected in series as a column. Under measuring conditions of a flow rate of 0.5 mL/min and using hexafluoroisopropanol as a solvent, 0.1 mL of a solution having a sample concentration of 1 mg/mL was injected.

(7) Stereocomplex Formation Ratio (Sc) in Mixture of Poly-L-Lactic Acid and Poly-D-Lactic Acid Using a differential scanning calorimeter, the temperature of a sample was increased from 30° C. to 240° C. at a temperature increase rate of 20° C./minute and the measurement was made. In the measurement of first run, heat based on crystal melting of a crystal of poly-L-lactic acid alone and a crystal of poly-L-lactic acid alone, which appears at a temperature of 150° C. or higher and lower than 190° C., was denoted $\Delta Hl$, and heat based on crystal melting of a stereocomplex crystal, which appears at a temperature of 190° C. or higher and lower than 250° C., was denoted $\Delta Hh$. The stereocomplex formation ratio (Sc) was calculated by the following equation (3).

$$Sc = \Delta Hh/(\Delta Hl + \Delta Hh) \times 100 \quad (3)$$

(8) Stereocomplex Formation Ratio (Sc) of Polymer after Subjecting Mixture of Poly-L-Lactic Acid and Poly-D-Lactic Acid to Solid Phase Polymerization The stereocomplex formation rate (Sc) was calculated by the above equation (3). In this case, in a second run in which the temperature of the polymer was increased within a range from 30° C. to 240° C. at a temperature increase rate of 20° C./minute and, furthermore, the temperature of the polymer was decreased within a range from 240° C. to 30° C. at a temperature decrease rate of 20° C./minute, and then the temperature of the polymer was increased within a range from 30° C. to 240° C. at a temperature increase rate of 20° C./minute in the measurement using a differential scanning calorimeter, heat based on crystal melting of a poly-L-lactic acid alone crystal and a poly-D-lactic acid alone crystal, which appears at a temperature of 150° C. or higher and lower than 190° C., was denoted $\Delta Hl$, and heat based on crystal melting of a stereocomplex crystal, which appears at a temperature of 190° C. or higher and lower than 250° C., was denoted $\Delta Hh$, and thus the stereocomplex formation ratio was calculated.

Examples 1 to 22, Comparative Examples 1 to 2

As described in Tables 1 and 2, a polyester resin was supplied to a twin-screw extruder (L/D=45.5) Model TEX30 manufactured by The Japan Steel Works, Ltd. and crystallization of the present invention was performed. The plasticization portion set at the temperature described in Tables 1 and 2 was provided at the portion where L/D=10 from a resin supply port of the extruder. Also, the crystallized portion set at the temperature described in Tables 1 and 2 was provided at the downstream of the plasticization portion. A screw capable of applying a shear was formed by providing a kneading block with a length of L/D=4 at two positions using a plurality of kneading disks in combination as a screw element of the crystallization portion. Using the following equation, the value of a shear rate of a kneading block portion was calculated.

(Shear rate)=$\pi \times$(screw diameter)$\times$(screw rotational speed)/(clearance between screw and extruder)

First, a polymer was injected in an ice bath through an extruder die and sampling was performed for the measurement of melt viscosity and crystallinity. Thereafter, an underwater cutter was mounted to an extruder die and the polymer ejected through the die was pelletized. The melt viscosity, crystallinity and the like of the obtained samples are as shown in Tables 1 and 2. All of the samples of Comparative Examples 1 to 2 exhibited a low crystallinity and a low melt viscosity, and thus it was difficult to cut using an underwater cutter. In contrast, the samples of Examples 1 to 18 and 21 to 22 exhibited a high melt viscosity and were easily cut by an underwater cutter, and thus it is apparent to be excellent in processability. The samples of Examples 19 and 20 could be cut. However, some pellets fused to each other and there was unevenness in the pellet size.

TABLE 1

| | | | Examples | | | | | | |
|---|---|---|---|---|---|---|---|---|---|
| | | | 1 | 2 | 3 | 4 | 5 | 6 | 7 |
| Aliphatic polyester or polyalkylene terephthalate | | | A-1 | A-1 | A-1 | A-1 | A-1 | A-1 | A-1 |
| Conditions | Plasticization portion setting temperature | °C. | 180 | 180 | 180 | 180 | 180 | 180 | 180 |
| | Crystallization portion setting temperature | °C. | 160 | 155 | 150 | 145 | 140 | 130 | 110 |
| | Screw rotational speed | rpm | 200 | 200 | 200 | 200 | 200 | 200 | 200 |
| | Shear rate | 1/second | 150 | 150 | 150 | 150 | 150 | 150 | 150 |
| | Raw material supply amount | kg/h | 20 | 20 | 20 | 20 | 20 | 20 | 20 |
| | Retention time | sec | 61 | 60 | 60 | 60 | 59 | 60 | 60 |
| | Resin temperature | °C. | 161 | 154 | 151 | 146 | 140 | 130 | 112 |
| On-line melt viscosity | | Pa·s | 40 | 88 | 162 | 240 | 350 | 550 | 650 |
| (Measuring temperature) | | (°C.) | (160) | (155) | (150) | (145) | (140) | (130) | (110) |
| Melt viscosity | | Pa·s | 45 | 95 | 155 | 230 | 370 | 520 | 640 |
| (Measuring temperature) | | (°C.) | (160) | (155) | (150) | (145) | (140) | (130) | (110) |
| Polymer turbidity | | — | A | A | A | A | A | A | A |
| Crystallinity | | % | 32 | 33 | 35 | 36 | 35 | 36 | 35 |

TABLE 1-continued

| | | | | | | | | |
|---|---|---|---|---|---|---|---|---|
| Degree of Crystallization (DSC) | % | 95 | 98 | 100 | 100 | 100 | 100 | 100 |

| | | | Examples | | | | |
|---|---|---|---|---|---|---|---|
| | | | 8 | 9 | 10 | 11 | 12 |
| Aliphatic polyester or polyalkylene terephthalate | | | A-1 | A-1 | A-1 | A-1 | A-2 |
| Conditions | Plasticization portion setting temperature | ° C. | 180 | 180 | 180 | 180 | 190 |
| | Crystallization portion setting temperature | ° C. | 145 | 145 | 145 | 145 | 130 |
| | Screw rotational speed | rpm | 100 | 300 | 200 | 200 | 200 |
| | Shear rate | 1/second | 75 | 225 | 150 | 150 | 150 |
| | Raw material supply amount | kg/h | 20 | 20 | 10 | 40 | 20 |
| | Retention time | sec | 60 | 55 | 120 | 32 | 60 |
| | Resin temperature | ° C. | 145 | 148 | 146 | 145 | 142 |
| On-line melt viscosity | | Pa·s | 185 | 225 | 255 | 238 | 850 |
| (Measuring temperature) | | (° C.) | (145) | (145) | (145) | (145) | (135) |
| Melt viscosity | | Pa·s | 180 | 240 | 210 | 220 | 880 |
| (Measuring temperature) | | (° C.) | (145) | (145) | (145) | (145) | (135) |
| Polymer turbidity | | — | A | A | A | A | A |
| Crystallinity | | % | 33 | 35 | 35 | 36 | 34 |
| Degree of Crystallization (DSC) | | % | 98 | 100 | 100 | 100 | 100 |

TABLE 2

| | | | Examples | | | | | | |
|---|---|---|---|---|---|---|---|---|---|
| | | | 13 | 14 | 15 | 16 | 17 | 18 | 19 |
| Aliphatic polyester or polyalkylene terephthalate | | | A-2 | A-3 | A-3 | A-3 | A-4 | A-4 | A-5 |
| Conditions | Plasticization portion setting temperature | ° C. | 190 | 190 | 190 | 190 | 170 | 170 | 150 |
| | Crystallization portion setting temperature | ° C. | 155 | 145 | 155 | 155 | 145 | 130 | 120 |
| | Screw rotational speed | rpm | 200 | 200 | 250 | 200 | 200 | 200 | 250 |
| | Shear rate | 1/second | 150 | 190 | 190 | 150 | 150 | 150 | 190 |
| | Raw material supply amount | kg/h | 20 | 20 | 20 | 20 | 20 | 20 | 10 |
| | Retention time | sec | 60 | 60 | 60 | 55 | 60 | 60 | 115 |
| | Resin temperature | ° C. | 157 | 159 | 160 | 168 | 146 | 130 | 118 |
| On-line melt viscosity | | Pa·s | 240 | 980 | 305 | 520 | 190 | 380 | 78 |
| (Measuring temperature) | | (° C.) | (155) | (150) | (155) | (155) | (145) | (130) | (120) |
| Melt viscosity | | Pa·s | 220 | 950 | 420 | 550 | 180 | 375 | 68 |
| (Measuring temperature) | | (° C.) | (155) | (150) | (155) | (155) | (145) | (130) | (120) |
| Polymer turbidity | | — | A | A | A | B | A | A | A |
| Crystallinity | | % | 33 | 32 | 30 | 27 | 36 | 35 | 30 |
| Degree of Crystallization (DSC) | | % | 100 | 89 | 85 | 78 | 100 | 100 | 100 |

| | | | Examples | | | Comparative Examples | |
|---|---|---|---|---|---|---|---|
| | | | 20 | 21 | 22 | 1 | 2 |
| Aliphatic polyester or polyalkylene terephthalate | | | A-5 | A-6 | A-7 | A-1 | A-1 |
| Conditions | Plasticization portion setting temperature | ° C. | 150 | 250 | 280 | 180 | 180 |
| | Crystallization portion setting temperature | ° C. | 120 | 210 | 255 | 180 | 150 |
| | Screw rotational speed | rpm | 250 | 200 | 200 | 200 | 10 |

TABLE 2-continued

|  | | | | | | |
|---|---|---|---|---|---|---|
| Shear rate | 1/second | 190 | 150 | 150 | 150 | 8 |
| Raw material supply amount | kg/h | 20 | 20 | 20 | 20 | 5 |
| Retention time | sec | 55 | 60 | 61 | 61 | 200 |
| Resin temperature | °C. | 120 | 212 | 256 | 181 | 150 |
| On-line melt viscosity | Pa·s | 30 | 350 | 420 | 0.5 | 5 |
| (Measuring temperature) | (°C.) | (120) | (210) | (255) | (180) | (150) |
| Melt viscosity | Pa·s | 32 | 290 | 400 | 0.3 | 2 |
| (Measuring temperature) | (°C.) | (120) | (210) | (255) | (180) | (150) |
| Polymer turbidity | — | A | A | A | C | B |
| Crystallinity | % | 29 | 40 | 33 | 2 | 8 |
| Degree of Crystallization (DSC) | % | 100 | 95 | 90 | 3 | 15 |

Comparative Example 3

Using a pellet fluid heating type dryer (Torusdisc, manufactured by HOSOKAWA MICRON CORPORATION), a polyester resin (A-1) was subjected to a crystallization treatment at 130° C. However, when the pellet temperature reaches 60° C., fusion between pallets occurred and the treatment could not be continued.

Comparative Example 4

In the same manner as in Comparative Example 3, a polyester resin (A-5) was subjected to a crystallization treatment at 130° C. In order to obtain pellets having a crystallinity of 35% and a crystallization rate of 90%, a treatment time of 60 minutes was required.

Examples 23 to 26, Comparative Examples 5 to 6

As described in Table 3, a polyester resin was supplied to a twin-screw extruder (L/D=45.5) Model TEX30 manufactured by The Japan Steel Works, Ltd. and crystallization of the present invention was performed. The plasticization portion set at the temperature of 180° C. was provided at the portion where L/D=10 from a resin supply port of the extruder. Also, the crystallized portion set at the temperature described in Table 3 was provided at the downstream of the plasticization portion. In Examples, a screw capable of applying a pressure was formed by introducing a seal ring into a screw element of the crystallization portion. In Comparative Examples 5 to 6, a screw element of the crystallization portion was also composed of a conventional full-flight element. Using a pressure gauge mounted to the extruder, the pressure upon treatment was measured.

First, a polymer was injected in an ice bath through an extruder die and sampling was performed for the measurement of melt viscosity and crystallinity. Thereafter, an underwater cutter was mounted to an extruder die and the polymer ejected through the die was pelletized. The melt viscosity, crystallinity and the like of the obtained samples are as shown in Table 3. All of the samples of Comparative Examples 5 to 6 exhibited a low crystallinity and a low melt viscosity, and thus it was difficult to cut using an underwater cutter. In contrast, the samples of Examples were easily cut.

TABLE 3

|  | | | Examples | | | | Comparative Examples | |
|---|---|---|---|---|---|---|---|---|
|  | | | 23 | 24 | 25 | 26 | 5 | 6 |
| Aliphatic polyester or polyalkylene terephthalate | | | A-1 | A-1 | A-1 | A-1 | A-1 | A-1 |
| Conditions | Plasticization portion setting temperature | °C. | 180 | 180 | 180 | 180 | 180 | 180 |
|  | Crystallization portion setting temperature | °C. | 160 | 150 | 140 | 130 | 180 | 150 |
|  | Screw rotational speed | rpm | 200 | 200 | 200 | 200 | 200 | 200 |
|  | Shear rate | 1/second | 2.4 | 4.2 | 6.8 | 8 | 0 | 0.2 |
|  | Raw material supply amount | kg/h | 20 | 20 | 20 | 20 | 20 | 20 |
|  | Retention time | sec | 85 | 84 | 85 | 85 | 34 | 34 |
|  | Resin temperature | °C. | 160 | 151 | 140 | 130 | 182 | 150 |
| On-line melt viscosity | | Pa·s | 45 | 155 | 365 | 530 | 0.4 | 3 |
| (Measuring temperature) | | (°C.) | (160) | (150) | (140) | (130) | (180) | (150) |
| Melt viscosity | | Pa·s | 38 | 150 | 370 | 495 | 1.2 | 4 |
| (Measuring temperature) | | (°C.) | (160) | (150) | (140) | (130) | (180) | (150) |
| Polymer turbidity | | — | A | A | A | A | C | C |
| Crystallinity | | % | 33 | 34 | 36 | 36 | 2 | 5 |
| Degree of Crystallization (DSC) | | % | 95 | 100 | 100 | 100 | 2 | 8 |

Examples 27 to 52, Comparative Examples 7 to 8 and 10 to 11

Pellets obtained in Examples 1 to 26 and Comparative Examples 1 to 2 and 5 to 6 were placed in a vacuum dryer, subjected to solid phase polymerization at 140° C. under a pressure of 13.3 Pa for 4 hours, subjected to solid phase polymerization for 4 hours by raising the temperature at 150° C., and then subjected to solid phase polymerization for 10 hours by raising the temperature to 160° C.

Comparative Example 9

Non-crystallized pellets produced in Comparative Example 1 were subjected to a heat crystallization treatment by being left to stand for 1 hour in a hot air oven at 110° C., placed in a vacuum dryer, subjected to solid phase polymerization at 140° C. under a pressure of 13.3 Pa for 4 hours, subjected to solid phase polymerization for 4 hours by raising the temperature at 150° C., and then subjected to solid phase polymerization for 10 hours by raising the temperature to 160° C.

As shown in Table 4 to 6, in all of the samples of Examples 27 to 52, a remarkable increase in high molecular weight was observed after the solid phase polymerization and the melting point became higher. In contrast, a polymer having a sufficient molecular weight could not be obtained in Comparative Examples 7 to 11. It is apparent that the samples of Examples are excellent.

TABLE 4

| | | Examples | | | | | | |
|---|---|---|---|---|---|---|---|---|
| | | 27 | 28 | 29 | 30 | 31 | 32 | 33 |
| Aliphatic polyester or polyalkylene terephthalate | | Example 1 | Example 2 | Example 3 | Example 4 | Example 5 | Example 6 | Example 7 |
| Weight average molecular weight after solid phase polymerization | $\times 10^4$ | 16.4 | 17.6 | 19.2 | 20.1 | 19.8 | 19.5 | 19.6 |
| Melting point after solid phase polymerization | ° C. | 175 | 175 | 179 | 181 | 180 | 180 | 181 |

| | | Examples | | | | |
|---|---|---|---|---|---|---|
| | | 34 | 35 | 36 | 37 | 38 |
| Aliphatic polyester or polyalkylene terephthalate | | Example 8 | Example 9 | Example 10 | Example 11 | Example 12 |
| Weight average molecular weight after solid phase polymerization | $\times 10^4$ | 17.9 | 18.8 | 16.8 | 19.2 | 21.9 |
| Melting point after solid phase polymerization | ° C. | 177 | 178 | 176 | 179 | 181 |

TABLE 5

| | | Examples | | | | | | | |
|---|---|---|---|---|---|---|---|---|---|
| | | 39 | 40 | 41 | 42 | 43 | 44 | 45 | 46 |
| Aliphatic polyester or polyalkylene terephthalate | | Example 13 | Example 14 | Example 15 | Example 16 | Example 17 | Example 18 | Example 19 | Example 20 |
| Weight average molecular weight after solid phase polymerization | $\times 10^4$ | 22.3 | 19.3 | 18.9 | 17.8 | 19.7 | 19.4 | 14.2 | 13.4 |
| Melting point after solid phase polymerization | ° C. | 182 | 180 | 179 | 179 | 178 | 179 | 173 | 172 |

| | | Examples | | Comparative Examples | | |
|---|---|---|---|---|---|---|
| | | 47 | 48 | 7 | 8 | 9 |
| Aliphatic polyester or polyalkylene terephthalate | | Example 21 | Example 22 | Comparative Example 1 | Comparative Example 2 | |
| Weight average molecular weight | $\times 10^4$ | 3.5 | 3.4 | 5.3 | 7.2 | 11.8 |

TABLE 5-continued

|  |  |  |  |  |  |  |
|---|---|---|---|---|---|---|
| after solid phase polymerization Melting point after solid phase polymerization | ° C. | 270 | 251 | 167 | 171 | 169 |

TABLE 6

|  |  | Examples | | | | Comparative Examples | |
|---|---|---|---|---|---|---|---|
|  |  | 49 | 50 | 51 | 52 | 10 | 11 |
| Aliphatic polyester or polyalkylene terephthalate |  | Example 19 | Example 20 | Example 21 | Example 22 | Comparative Example 3 | Comparative Example 4 |
| Weight average molecular weight after solid phase polymerization | ×10$^4$ | 17.8 | 18.9 | 20.0 | 20.1 | 5.8 | 6.5 |
| Melting point after solid phase polymerization | ° C. | 178 | 180 | 180 | 181 | 168 | 170 |

Examples 53 to 67, Comparative Examples 12 to 13

As the step of treating poly-L-lactic acid and poly-D-lactic acid, as described in Tables 7 and 8, poly-L-lactic acid was supplied to a twin screw extruder (L/D=45.5) Model TEX30 manufactured by The Japan Steel Works, Ltd., and a crystallization treatment of the present invention was performed. The twin screw extruder was provided with the plasticization portion set at a temperature of 180° C. at the portion where L/D=10 from a resin supply port. Also, the crystallized portion set at the temperature described in Tables 7 and 8 was provided at the downstream of the plasticization portion. A screw capable of applying a shear was formed by providing with a kneading disk as a screw element of the crystallization portion.

On the other hand, poly-D-lactic acid was subjected to a crystallization treatment by heating under a nitrogen atmosphere. At this time, the treatment temperature and time are as described in Tables 7 and 8.

First, poly-L-lactic acid was ejected in an ice bath through an extruder die and sampling was performed for the measurement of a crystallization rate. With respect to the sampled poly-L-lactic acid and poly-D-lactic acid after subjected to the heat crystallization treatment, the crystallization rate and (ΔHm−ΔHc) are respectively as shown in Tables 7 and 8. In Examples 53 to 66, both poly-L-lactic acid and poly-D-lactic acid exhibited a high degree of crystallization and high (ΔHm−ΔHc) and were excellent in crystallization characteristics. In contrast, in Example 67 and Comparative Example 12, only poly-D-lactic acid exhibited a high degree of crystallization and high (ΔHm−ΔHc). In Comparative Example 13, both poly-L-lactic acid and poly-D-lactic acid exhibited a low degree of crystallization and low (ΔHm−ΔHc).

Subsequently, as the step of mixing poly-L-lactic acid and poly-D-lactic acid, the heat-treated poly-D-lactic acid was added to the poly-L-lactic acid shear-crystallized by a twin screw extruder from a side feeder disposed at the portion where L/D=30 from a resin supply port, followed by mixing. A screw capable of applying a shear was formed by providing a kneading disk as a screw element of the mixing portion, and mixing was performed under application of a shear. The temperature setting upon mixing, polymer turbidity and crystallinity are as shown in Tables 7 and 8. The degree of crystallization and stereocomplex formation ratio (Sc) of the mixture after mixing are also as described in Tables 7 and 8.

As is apparent from the results of Tables 7 and 8, in Examples 53 to 65, an increase in the melting point of the mixture upon and after mixing was observed, and crystallization properties such as crystallinity and degree of crystallization were excellent. In each Example, the stereocomplex formation ratio was 80% or less. In Examples 66 to 67, although the mixture upon and after mixing was crystallized, crystallization properties were low. Also, the stereocomplex formation ratio was high. In Comparative Examples 12 to 13, an increase in the melting point of the mixture was observed and the stereocomplex formation ratio was 80% or more. However, any of crystallization properties such as crystallinity and degree of crystallization exhibited a low value.

TABLE 7

| | | | | Polymer crystallization treatment step before mixing | | | | | | | |
|---|---|---|---|---|---|---|---|---|---|---|---|
| | | Aliphatic polyester | Treatment method | Plasticization portion setting temperature ° C. | Crystallization portion setting temperature ° C. | Screw rotational speed rpm | Shear rate 1/second | Raw material supply amount kg/hour | Treatment time sec | Resin temperature ° C. | ΔHm-ΔHc J/g | Degree of Crystallization % |
| Example 53 | A-8 | Shear | 180 | 130 | 200 | 150 | 20 | 40 | 130 | 55 | 100 |
| | A-11 | Heating | — | 110 | — | — | — | 3600 | 110 | 54 | 100 |
| Example 54 | A-8 | Shear | 180 | 140 | 200 | 150 | 20 | 40 | 141 | 54 | 100 |
| | A-11 | Heating | — | 110 | — | — | — | 3600 | 110 | 54 | 100 |

TABLE 7-continued

| | | | | | | | | | | | |
|---|---|---|---|---|---|---|---|---|---|---|---|
| Example 55 | A-8 | Shear | 180 | 150 | 200 | 150 | 20 | 38 | 150 | 50 | 94 |
| | A-11 | Heating | — | 110 | — | — | — | 3600 | 110 | 54 | 100 |
| Example 56 | A-8 | Shear | 180 | 160 | 200 | 150 | 20 | 39 | 159 | 48 | 93 |
| | A-11 | Heating | — | 110 | — | — | — | 3600 | 110 | 54 | 100 |
| Example 57 | A-8 | Shear | 180 | 140 | 50 | 38 | 20 | 39 | 139 | 49 | 90 |
| | A-11 | Heating | — | 110 | — | — | — | 3600 | 110 | 54 | 100 |
| Example 58 | A-8 | Shear | 180 | 140 | 100 | 75 | 20 | 41 | 140 | 52 | 96 |
| | A-11 | Heating | — | 110 | — | — | — | 3600 | 110 | 54 | 100 |
| Example 59 | A-8 | Shear | 180 | 140 | 300 | 225 | 20 | 35 | 143 | 55 | 100 |
| | A-11 | Heating | — | 110 | — | — | — | 3600 | 110 | 54 | 100 |
| Example 60 | A-8 | Shear | 180 | 140 | 200 | 150 | 20 | 41 | 140 | 54 | 100 |
| | A-11 | Heating | — | 110 | — | — | — | 3600 | 110 | 54 | 100 |

| | Mixing step | | | | | |
|---|---|---|---|---|---|---|
| | L/D Mixing ratio wt/wt | Mixing temperature °C. | Polymer turbidity | Crystallinity % | Weight average molecular weight × 10⁴ | Melting point after mixing °C. | Degree of Crystallization % | Sc % |
| Example 53 | 50/50 | 140 | A | 35 | 1.6 | 150/208 | 100 | 39 |
| Example 54 | 50/50 | 140 | A | 36 | 1.7 | 149/206 | 100 | 43 |
| Example 55 | 50/50 | 140 | A | 32 | 1.5 | 148/207 | 97 | 52 |
| Example 56 | 50/50 | 140 | A | 30 | 1.5 | 148/205 | 96 | 54 |
| Example 57 | 50/50 | 140 | A | 32 | 1.7 | 149/214 | 92 | 62 |
| Example 58 | 50/50 | 140 | A | 33 | 1.6 | 148/210 | 97 | 51 |
| Example 59 | 50/50 | 140 | A | 36 | 1.5 | 147/205 | 100 | 40 |
| Example 60 | 50/50 | 130 | A | 35 | 1.7 | 148/206 | 100 | 43 |

TABLE 8

| | Polymer crystallization treatment step before mixing | | | | | | | | | | |
|---|---|---|---|---|---|---|---|---|---|---|---|
| | Aliphatic polyester | Treatment method | Plasticization portion setting temperature °C. | Crystallization portion setting temperature °C. | Screw rotational speed rpm | Shear rate 1/second | Raw material supply amount kg/h | Treatment time sec | Resin temperature °C. | ΔHm−ΔHc J/g | Degree of Crystallization % |
| Example 61 | A-8 | Shear | 180 | 140 | 200 | 150 | 20 | 40 | 140 | 54 | 100 |
| | A-11 | Heating | — | 110 | — | — | — | 3600 | 110 | 54 | 100 |
| Example 62 | A-8 | Shear | 180 | 140 | 200 | 150 | 20 | 40 | 140 | 54 | 100 |
| | A-11 | Heating | — | 110 | — | — | — | 3600 | 110 | 54 | 100 |
| Example 63 | A-8 | Shear | 180 | 140 | 200 | 150 | 20 | 40 | 140 | 55 | 100 |
| | A-11 | Heating | — | 110 | — | — | — | 3600 | 110 | 54 | 100 |
| Example 64 | A-9 | Shear | 190 | 150 | 200 | 150 | 20 | 40 | 152 | 53 | 92 |
| | A-12 | Heating | — | 120 | — | — | — | 3600 | 120 | 54 | 98 |
| Example 65 | A-10 | Shear | 190 | 160 | 200 | 150 | 20 | 41 | 163 | 48 | 87 |
| | A-13 | Heating | — | 125 | — | — | — | 3600 | 125 | 50 | 96 |
| Example 66 | A-8 | Shear | 180 | 140 | 200 | 150 | 20 | 40 | 141 | 54 | 100 |
| | A-11 | Heating | — | 110 | — | — | — | 3600 | 110 | 54 | 100 |
| Example 67 | A-8 | Shear | 180 | 150 | 7 | 5 | 5 | 160 | 150 | 14 | 25 |
| | A-11 | Heating | — | 110 | — | — | — | 3600 | 110 | 54 | 100 |
| Comparative Example 12 | A-8 | Shear | 180 | 180 | 200 | 150 | 20 | 40 | 179 | 4 | 8 |
| | A-11 | Heating | — | 110 | — | — | — | 3600 | 110 | 54 | 100 |
| Comparative | A-8 | No | — | — | — | — | — | — | — | 3 | 5 |

TABLE 8-continued

| | | | | | | | | | | |
|---|---|---|---|---|---|---|---|---|---|---|
| Example 13 | A-11 | treatment No treatment | — | — | — | — | — | — | — | 2 | 4 |

| | Mixing step | | | | | | | |
|---|---|---|---|---|---|---|---|---|
| | L/D Mixing ratio wt/wt | Mixing temperature °C. | Polymer turbidity | Crystallinity % | Weight average molecular weight × 10⁴ | Melting point after mixing °C. | Degree of Crystallization % | Sc % |
| Example 61 | 50/50 | 150 | A | 36 | 1.7 | 149/210 | 100 | 44 |
| Example 62 | 50/50 | 160 | A | 32 | 1.5 | 148/207 | 95 | 38 |
| Example 63 | 70/30 | 140 | A | 38 | 1.7 | 149/208 | 100 | 18 |
| Example 64 | 50/50 | 150 | A | 33 | 4.6 | 157/206 | 93 | 47 |
| Example 65 | 50/50 | 160 | A | 31 | 7.9 | 168/205 | 88 | 58 |
| Example 66 | 50/50 | 230 | C | 0 | 1.4 | 209 | 5 | 100 |
| Example 67 | 50/50 | 150 | B | 7 | 1.6 | 148/208 | 35 | 84 |
| Comparative Example 12 | 50/50 | 150 | C | 0 | 1.4 | 147/211 | 28 | 87 |
| Comparative Example 13 | 50/50 | 150 | C | 0 | 1.7 | 207 | 2 | 100 |

Examples 68 to 80, Reference Examples 12 to 13, Comparative Examples 14 to 15

The mixture obtained in Examples 53 to 67 and Comparative Examples 12 to 13 was placed in a vacuum dryer, subjected to solid phase polymerization at 140° C. under a pressure of 13.3 Pa for 4 hours, subjected to solid phase polymerization for 4 hours by raising the temperature to 150° C., and then subjected to solid phase polymerization for 10 hours by raising the temperature to 160° C. As shown in Table 9, in all of Examples 68 to 80, the molecular weight increased to 100,000 or more after the solid phase polymerization, and an increase in melting point and a stereocomplex formation ratio of 70% or more were observed. In contrast, in Reference Examples 12 to 13 and Comparative Examples 14 to 15, an increase in melting point and a stereocomplex formation ratio of 70% or more were observed. However, the molecular weight after the solid phase polymerization did not increase to 100,000 or more.

TABLE 9

| | Solid phase polymerization step | | | |
|---|---|---|---|---|
| | Polyester (Ratio L/D) | Weight average molecular weight ×10⁴ | Melting point after solid phase polymerization °C. | Sc % |
| Example 68 | Example 53 (50/50) | 13.7 | 170/208 | 88 |
| Example 69 | Example 54 (50/50) | 13.2 | 168/205 | 90 |
| Example 70 | Example 55 (50/50) | 12.5 | 166/207 | 95 |
| Example 71 | Example 56 (50/50) | 12.1 | 167/206 | 98 |
| Example 72 | Example 57 (50/50) | 11.0 | 165/212 | 96 |
| Example 73 | Example 58 (50/50) | 12.5 | 168/208 | 94 |
| Example 74 | Example 59 (50/50) | 13.3 | 169/206 | 89 |
| Example 75 | Example 60 (50/50) | 12.6 | 168/205 | 93 |
| Example 76 | Example 61 (50/50) | 13.1 | 170/210 | 94 |
| Example 77 | Example 62 (50/50) | 12.9 | 169/208 | 92 |
| Example 78 | Example 63 (70/30) | 16.2 | 172/210 | 72 |
| Example 79 | Example 64 (50/50) | 14.3 | 168/209 | 87 |
| Example 80 | Example 65 (50/50) | 13.6 | 170/212 | 88 |
| Reference Example 13 | Example 66 (50/50) | 2.3 | 208 | 100 |
| Reference Example 14 | Example 67 (50/50) | 3.7 | 164/208 | 98 |
| Comparative Example 14 | Comparative Example 12 (50/50) | 2.5 | 162/209 | 99 |
| Comparative Example 15 | Comparative Example 13 (50/50) | 2.6 | 207 | 100 |

Examples 81 to 100

As the step of treating poly-L-lactic acid and poly-D-lactic acid, as described in Tables 10 and 11, poly-L-lactic acid was supplied to a twin screw extruder (L/D=45.5) Model TEX30 manufactured by The Japan Steel Works, Ltd., and the crystallization treatment of the present invention was performed. The twin screw extruder was provided with the plasticization portion set at a temperature of 180° C. at the portion where L/D=10 from a resin supply port. Also, the crystallized portion set at the temperature described in Tables 10 and 11 was provided at the downstream of the plasticization portion. A screw capable of applying a shear was formed by providing a kneading disk as a screw element of the crystallization portion.

Similarly to poly-L-lactic acid, poly-D-lactic acid was subjected to the crystallization treatment of the present invention using a twin screw extruder (L/D=45.5) Model TEX30 manufactured by The Japan Steel Works, Ltd. Screw arrangement of the twin screw extruder is the same as that in case of the crystallization treatment of poly-L-lactic acid, and the temperature setting of the crystallized portion is as described in Tables 10 and 11.

First, a polymer was ejected in an ice bath through an extruder die and sampling was performed for the measurement of a degree of crystallization. With respect to the sampled poly-L-lactic acid and poly-D-lactic acid, the degree of crystallization and (ΔHm−ΔHc) are respectively shown in Tables 10 and 11. In Examples 81 to 98, both poly-L-lactic acid and poly-D-lactic acid exhibited a high degree of crystallization and high (ΔHm−ΔHc) and were excellent in crystallization properties. In contrast, in Examples 99 and 100, only poly-D-lactic acid exhibited a high degree of crystallization and high (ΔHm−ΔHc).

As the step of mixing poly-L-lactic acid and poly-D-lactic acid, the crystallized poly-D-lactic acid was added to the poly-L-lactic acid crystallized by the twin screw extruder from a side feeder disposed at the portion where L/D=30 from a resin supply port, followed by mixing. A screw capable of applying a shear was formed by providing a kneading disk as a screw element of the mixing portion, and mixing was performed under application of a shear. The temperature setting upon mixing, polymer turbidity and crystallinity are as shown in Tables 10 and 11. The degree of crystallization and stereocomplex formation ratio (Sc) of the mixture after mixing are also as described in Tables 10 and 11.

As is apparent from the results of Tables 10 and 11, in Examples 81 to 97, an increase in the melting point of the mixture upon and after mixing was observed, and crystallization properties such as crystallinity and degree of crystallization were excellent. In each Example, the stereocomplex formation ratio was 80% or less. In Examples 99 and 100, although the mixture upon and after mixing was crystallized, crystallization properties were low. However, the stereocomplex formation ratio was high, such as 80% or more. In Example 98, an increase in the melting point of the mixture was observed and the stereocomplex formation ratio was 80% or more. However, any of crystallization properties such as crystallinity and degree of crystallization exhibited a low value.

TABLE 10

| | | | | Polymer treatment step before mixing | | | | | | |
|---|---|---|---|---|---|---|---|---|---|---|
| | Aliphatic polyester | Treatment method | Plasticization portion setting temperature | Crystallization portion setting temperature °C. | Screw rotational speed rpm | Shear rate 1/second | Raw material supply amount kg/h | Treatment time sec | Resin temperature °C. | ΔHm−ΔHc J/g | Degree of Crystallization % |
| Example 81 | A-8 | Shear | 180 | 140 | 200 | 150 | 20 | 40 | 140 | 54 | 100 |
| | A-11 | Shear | 180 | 130 | 200 | 150 | 20 | 40 | 130 | 55 | 100 |
| Example 82 | A-8 | Shear | 180 | 140 | 200 | 150 | 20 | 40 | 141 | 54 | 100 |
| | A-11 | Shear | 180 | 140 | 200 | 150 | 20 | 40 | 140 | 54 | 100 |
| Example 83 | A-8 | Shear | 180 | 140 | 200 | 150 | 20 | 40 | 141 | 54 | 100 |
| | A-11 | Shear | 180 | 150 | 200 | 150 | 20 | 38 | 150 | 50 | 94 |
| Example 84 | A-8 | Shear | 180 | 140 | 200 | 150 | 20 | 40 | 141 | 54 | 100 |
| | A-11 | Shear | 180 | 160 | 200 | 150 | 20 | 39 | 159 | 48 | 93 |
| Example 85 | A-8 | Shear | 180 | 130 | 200 | 150 | 20 | 40 | 130 | 55 | 100 |
| | A-11 | Shear | 180 | 130 | 200 | 150 | 20 | 40 | 130 | 55 | 100 |
| Example 86 | A-8 | Shear | 180 | 160 | 200 | 150 | 20 | 39 | 159 | 48 | 93 |
| | A-11 | Shear | 180 | 160 | 200 | 150 | 20 | 39 | 159 | 48 | 93 |
| Example 87 | A-8 | Shear | 180 | 140 | 200 | 150 | 20 | 40 | 141 | 54 | 100 |
| | A-11 | Shear | 180 | 140 | 50 | 38 | 20 | 39 | 140 | 48 | 89 |
| Example 88 | A-8 | Shear | 180 | 140 | 200 | 150 | 20 | 40 | 141 | 54 | 100 |
| | A-11 | Shear | 180 | 140 | 100 | 75 | 20 | 41 | 140 | 52 | 96 |
| Example 89 | A-8 | Shear | 180 | 140 | 200 | 150 | 20 | 40 | 141 | 54 | 100 |
| | A-11 | Shear | 180 | 140 | 300 | 225 | 20 | 36 | 142 | 55 | 100 |
| Example 90 | A-8 | Shear | 180 | 140 | 50 | 38 | 20 | 39 | 139 | 49 | 90 |
| | A-11 | Shear | 180 | 140 | 50 | 38 | 20 | 39 | 140 | 48 | 89 |

| | Mixing step | | | | | | | |
|---|---|---|---|---|---|---|---|---|
| | L/D Mixing ratio wt/wt | Mixing temperature °C. | Polymer turbidity | Crystallinity % | Weight average molecular weight × $10^4$ | Melting point after mixing °C. | Degree of Crystallization % | Sc % |
| Example 81 | 50/50 | 140 | A | 35 | 1.7 | 149/209 | 100 | 38 |
| Example 82 | 50/50 | 140 | A | 36 | 1.6 | 150/210 | 100 | 42 |
| Example 83 | 50/50 | 140 | A | 34 | 1.6 | 149/208 | 99 | 47 |
| Example 84 | 50/50 | 140 | A | 31 | 1.5 | 149/207 | 96 | 56 |
| Example 85 | 50/50 | 140 | A | 34 | 1.7 | 150/209 | 97 | 41 |
| Example 86 | 50/50 | 140 | A | 30 | 1.4 | 149/206 | 95 | 58 |
| Example 87 | 50/50 | 140 | A | 32 | 1.6 | 149/208 | 94 | 39 |
| Example 88 | 50/50 | 140 | A | 34 | 1.5 | 150/210 | 96 | 48 |

TABLE 10-continued

| | | | | | | | | |
|---|---|---|---|---|---|---|---|---|
| Example 89 | 50/50 | 140 | A | 35 | 1.6 | 148/209 | 98 | 44 |
| Example 90 | 50/50 | 140 | A | 31 | 1.7 | 151/210 | 94 | 52 |

TABLE 11

| | | Polymer treatment step before mixing | | | | | | | | | |
|---|---|---|---|---|---|---|---|---|---|---|---|
| | Aliphatic polyester | Treatment method | Plasticization portion setting temperature ° C. | Crystallization portion setting temperature ° C. | Screw rotational speed rpm | Shear rate 1/second | Raw material supply amount kg/h | Treatment time sec | Resin temperature ° C. | ΔHm-ΔHc J/g | Degree of Crystallization % |
| Example 91 | A-8 | Shear | 180 | 140 | 300 | 225 | 20 | 35 | 143 | 55 | 100 |
| | A-11 | Shear | 180 | 140 | 300 | 225 | 20 | 36 | 142 | 55 | 100 |
| Example 92 | A-8 | Shear | 180 | 140 | 200 | 150 | 20 | 40 | 141 | 54 | 100 |
| | A-11 | Shear | 180 | 140 | 200 | 150 | 20 | 40 | 140 | 54 | 100 |
| Example 93 | A-8 | Shear | 180 | 140 | 200 | 150 | 20 | 40 | 141 | 54 | 100 |
| | A-11 | Shear | 180 | 140 | 200 | 150 | 20 | 40 | 140 | 54 | 100 |
| Example 94 | A-8 | Shear | 180 | 140 | 200 | 150 | 20 | 40 | 141 | 54 | 100 |
| | A-11 | Shear | 180 | 140 | 200 | 150 | 20 | 40 | 140 | 54 | 100 |
| Example 95 | A-8 | Shear | 180 | 140 | 200 | 150 | 20 | 40 | 141 | 54 | 100 |
| | A-11 | Shear | 180 | 140 | 200 | 150 | 20 | 40 | 140 | 54 | 100 |
| Example 96 | A-9 | Shear | 190 | 150 | 200 | 150 | 20 | 40 | 152 | 53 | 92 |
| | A-12 | Shear | 190 | 150 | 200 | 150 | 20 | 40 | 151 | 53 | 93 |
| Example 97 | A-10 | Shear | 190 | 160 | 200 | 150 | 20 | 41 | 163 | 51 | 87 |
| | A-13 | Shear | 190 | 160 | 200 | 150 | 20 | 40 | 163 | 52 | 89 |
| Example 98 | A-8 | Shear | 180 | 140 | 200 | 150 | 20 | 40 | 141 | 54 | 100 |
| | A-11 | Shear | 180 | 140 | 200 | 150 | 20 | 40 | 140 | 54 | 100 |
| Example 99 | A-8 | Shear | 180 | 180 | 200 | 150 | 20 | 40 | 179 | 4 | 8 |
| | A-11 | Shear | 180 | 140 | 200 | 150 | 20 | 40 | 140 | 54 | 100 |
| Example 100 | A-8 | Shear | 180 | 150 | 7 | 5 | 5 | 160 | 150 | 14 | 25 |
| | A-11 | Shear | 180 | 140 | 200 | 150 | 20 | 40 | 140 | 54 | 100 |

| | Mixing step | | | | | | | |
|---|---|---|---|---|---|---|---|---|
| | L/D Mixing ratio wt/wt | Mixing temperature ° C. | Polymer turbidity | Crystallinity % | Weight average molecular weight × 10⁴ | Melting point after mixing ° C. | Degree of Crystallization % | Sc % |
| Example 91 | 50/50 | 140 | A | 36 | 1.4 | 147/209 | 100 | 42 |
| Example 92 | 50/50 | 130 | A | 35 | 1.6 | 148/209 | 100 | 40 |
| Example 93 | 50/50 | 150 | A | 36 | 1.6 | 151/212 | 100 | 37 |
| Example 94 | 50/50 | 160 | A | 33 | 1.5 | 147/207 | 97 | 46 |
| Example 95 | 70/30 | 140 | A | 37 | 1.7 | 151/209 | 99 | 13 |
| Example 96 | 50/50 | 150 | A | 33 | 4.7 | 156/208 | 93 | 47 |
| Example 97 | 50/50 | 160 | A | 31 | 8.0 | 168/207 | 88 | 58 |
| Example 98 | 50/50 | 230 | C | 0 | 1.4 | 148/209 | 5 | 100 |
| Example 99 | 50/50 | 150 | B | 4 | 1.4 | 148/209 | 19 | 89 |
| Example 100 | 50/50 | 150 | B | 8 | 1.5 | 148/210 | 37 | 86 |

Examples 101 to 117, Reference Examples 14 to 16

As the step of solid phase polymerization of a mixture of poly-L-lactic acid and poly-D-lactic acid, the mixture obtained in Examples 81 to 100 was placed in a vacuum dryer, subjected to solid phase polymerization at 140° C. under a pressure of 13.3 Pa for 4 hours, subjected to solid phase polymerization for 4 hours by raising the temperature to 150° C., and then subjected to solid phase polymerization for 10 hours by raising the temperature to 160° C. As shown in Table 12, in all of Examples 101 to 117, the molecular weight increased to 100,000 or more after the solid phase polymerization, and an increase in melting point and a stereocomplex formation ratio of 70% or more were observed. In contrast, in Reference Examples 14 to 16, an increase in melting point and a stereocomplex formation ratio of 70% or more were observed. However, the molecular weight after the solid phase polymerization did not increase to 100,000 or more.

TABLE 12

| | Polyester (Ratio L/D) | Weight average molecular weight ×10⁴ | Solid phase polymerization step Melting point after solid phase polymerization ° C. | Sc % |
|---|---|---|---|---|
| Example 101 | Example 83 (50/50) | 14.1 | 169/210 | 87 |
| Example 102 | Example 84 (50/50) | 13.5 | 170/209 | 91 |
| Example 103 | Example 85 (50/50) | 12.1 | 168/208 | 94 |
| Example 104 | Example 86 (50/50) | 11.5 | 169/212 | 96 |
| Example 105 | Example 87 (50/50) | 13.7 | 171/209 | 93 |
| Example 106 | Example 88 (50/50) | 11.2 | 169/207 | 95 |
| Example 107 | Example 89 (50/50) | 13.5 | 168/210 | 88 |
| Example 108 | Example 90 (50/50) | 12.6 | 167/209 | 91 |
| Example 109 | Example 91 (50/50) | 12.7 | 169/208 | 90 |
| Example 110 | Example 92 (50/50) | 11.7 | 170/207 | 94 |
| Example 111 | Example 93 (50/50) | 13.0 | 171/211 | 93 |
| Example 112 | Example 94 (50/50) | 12.8 | 168/209 | 90 |
| Example 113 | Example 95 (50/50) | 14.6 | 170/211 | 87 |
| Example 114 | Example 96 (50/50) | 11.4 | 166/205 | 95 |
| Example 115 | Example 97 (70/30) | 15.6 | 171/211 | 86 |
| Example 116 | Example 98 (50/50) | 13.9 | 169/210 | 87 |
| Example 117 | Example 99 (50/50) | 13.4 | 169/209 | 88 |
| Reference Example 14 | Example 100 (50/50) | 2.5 | 161/207 | 100 |
| Reference Example 15 | Example 101 (50/50) | 2.8 | 164/209 | 99 |
| Reference Example 16 | Example 102 (50/50) | 2.3 | 167/209 | 100 |

Example 118

From the pellets produced in Example 5, 10 pellets were selected at random. In the pellet having a diameter of about 3 mm, a surface layer portion (portion in a depth of 0 to 0.5 mm from a surface layer) and a center portion (portion in a depth of 1 to 2 mm from a surface layer) of the pellet were subjected to cutting work, and then a difference in crystallinity between the respective portions was evaluated. As a result, a difference between an average of crystallinity of the surface layer and an average of crystallinity of the center portion was 5%. With respect to the crystallinity of the center portion, a difference between the respective pellets was compared. As a result, a difference between the maximum and the minimum was 3%.

Comparative Example 16

Non-crystallized pellets produced in Comparative Example 1 were subjected to a heat crystallization treatment by being left to stand for 1 hour in a hot air oven at 110° C. In the same manner as in Example 118, 10 pellets were selected at random from the pellets after treatment, and a surface layer portion and a center portion were subjected to cutting work, and then the crystallinity was evaluated. As a result, a difference between an average of crystallinity of the surface layer and an average of crystallinity of the center portion was 25%. With respect to the crystallinity of the center portion, a difference between the respective pellets was compared. As a result, a difference between the maximum and the minimum was 15%.

It is apparent that Example 118 crystallized by the technique has a uniform crystallization state as compared with Comparative Example 16 in which a conventional heat crystallization treatment was performed. Such a uniformly crystallization state is preferred since physical properties are stabilized and, even if solid phase polymerization is performed, the polymerization reaction uniformly proceeds.

Example 119

Polymerization Step

In a continuous melt polymerization reactor in which four reaction vessels are connected in series via a feed pump, an aqueous 90% L-lactic acid solution was continuously supplied at a flow rate of 7 kg/hour. After respectively adjusting the temperature of first to fourth tanks to 150° C., 160° C., 170° C. and 175° C. and adjusting the degree of reduced pressure to 150 torr, 50 torr, 20 torr and 10 torr, methanesulfonic acid and tin (II) acetate as catalysts were continuously supplied in the amount of 0.07% by weight and 0.05 part by weight, respectively, based on lactic acid to be supplied to a second tank. While removing water, continuous polymerization was performed while adjusting the contents of each tank so that the total retention time of each tank becomes 15 hours. The prepolymer discharged from the fourth tank was supplied to the subsequent crystallization step without being solidified. A portion of the prepolymer was sampled and evaluated. As a result, the melting point was 150° C. and Mw was 20,000.

[Crystallization Step]

The obtained poly-L-lactic acid prepolymer was supplied to a co-rotation twin-screw extruder (L/D=35), equipped with a screw including a kneading disk, set at a cylinder temperature of 130° C., and a crystallization treatment was performed while applying a shear of a shear rate of 150/second and a pressure of 4.5 MPa. The cylinder temperature during an operation was controlled according to the measurement results of a pressure gauge mounted to an extruder tip, for example, the temperature is raised when the pressure decreased, whereas, the temperature is lowered when the pressure increased, and then the crystallization treatment was performed. The crystallized polylactic acid ejected through an extruder die was pelletized by cutting using an underwater cutter.

[Solid Phase Polymerization Step]

The pellets obtained in the pre-step were dried at 110° C. and supplied to a tower type continuous solid phase polymerization reactor, and the nitrogen at 160° C. was supplied from the lower portion of a solid phase polymerization reactor and then the pellets were dropped so that the retention time becomes 30 hours, and thus continuous solid phase polymerization was performed. As a result, a poly-L-lactic acid resin having a melting point of 182° C. and Mw of 213,000 was obtained, and a difference in melting point between pellets was 1° C. or lower and a difference in molecular weight was 6,000 or less.

Comparative Example 17

In the same manner as in Example 119, except that the crystallization step was performed under the following conditions, a poly-L-lactic acid resin was obtained. As a result, a melting point was 175° C., Mw was 125,000, a difference in melting point between pellets was 5° C., and a difference in molecular weight was 54,000.

[Crystallization Step]

The obtained poly-L-lactic acid prepolymer was dropped on a belt moving continuously and solidified, and then subjected to a crystallization treatment by blowing warm air at 110° C. from the upper and lower portions of the belt.

Example 120

A thermoplastic resin A-1 was once plasticized in an injection molder (SG75H-MIV, manufactured by Sumitomo Heavy Industries, Ltd.) by setting a cylinder temperature at 180° C. at a hopper side. After setting the cylinder temperature at 145° C., the thermoplastic resin was crystallized by melt-retaining at a screw rotating speed of 160 rpm. Subsequently, the crystallized thermoplastic resin was injected into a mold (at a mold temperature of 40° C.), cooled for 20 seconds and then taken out to produce a specimen (ASTM No. 1 dumbbell). The obtained specimen was non-defective which is free from the occurrence of burr. Characteristics of the specimen are shown in Table 13.

Comparative Example 18

In the same manner as in Example 120, except that the cylinder temperature was uniformly set at 180° C. from the hopper side to the nozzle side, a specimen was produced. The results are as shown in Table 13. In Comparative Example 18, a large amount of burr was generated upon molding since the melt viscosity is low.

It was apparent that Example 120 is excellent in molding processability as compared with Comparative Example 18 and the obtained molded article has a high crystallinity.

TABLE 13

| | | | Example 120 | Comparative Example 18 |
|---|---|---|---|---|
| Conditions | Aliphatic polyester | | A-1 | A-1 |
| | Plasticization portion setting temperature | ° C. | 180 | 180 |
| | Crystallization portion setting temperature | ° C. | 145 | 180 |
| | Screw rotational speed | rpm | 160 | 160 |
| | Shear rate | 1/second | 30 | 30 |
| | Appearance of molded article | — | Satisfactory | Much burr |
| | Crystallinity of molded article | % | 35 | 2 |
| | Degree of Crystallization of molded article (DSC) | % | 100 | 3 |

Thermoplastic resins used in the present Examples and Comparative Examples are as follows:
A-1: poly-L-lactic acid resin of Reference Example 1,
A-2: poly-L-lactic acid resin of Reference Example 2,
A-3: poly-L-lactic acid resin of Reference Example 3,
A-4: poly-L-lactic acid resin of Reference Example 4,
A-5: poly-L-lactic acid resin of Reference Example 5,
A-6: polyethylene terephthalate resin having a melting point of 260° C. and a weight average molecular weight of 16,000.
A-7: polyethylene terephthalate/isophthalate (94/6 mol %) resin having a melting point of 243° C. and a weight average molecular weight of 14,000,
A-8: poly-L-lactic acid resin of Reference Example 6,
A-9: poly-L-lactic acid resin of Reference Example 7,
A-10: poly-L-lactic acid resin of Reference Example 8,
A-11: poly-D-lactic acid resin of Reference Example 9,
A-12: poly-D-lactic acid resin of Reference Example 10, and
A-13: poly-D-lactic acid resin of Reference Example 11.

According to the present invention, a crystallized polyester having fluidity can be obtained in spite of having a crystal structure. The crystallized polyester of the present invention preferably has moderate fluidity by means of crystallization and therefore can provide a molded article which has excellent melt processability and also has high crystallinity. Since it is not necessary to perform the crystallization step in advance when solid phase polymerization is performed, the present invention is suited for the production of a high molecular weight polyester by solid phase polymerization.

The invention claimed is:

1. A method for producing a crystallized polyester, which comprises a crystallization step of applying a shear and/or a pressure to a polyester, wherein the polyester is polylactic acid, in a molten state at a temperature of (Tm−70° C.) to (Tm−5° C.), where Tm is a melting point of the polyester, thereby converting the polyester into a state having a crystallinity of 10% or more and fluidity, wherein the state of having fluidity is a state having a melt viscosity of 1000 Pa·s or less, and the polyester to be subjected to the crystallization step has a weight average molecular weight of 5,000 to 100,000.

2. The method for producing a crystallized polyester according to claim 1, wherein the polyester to be subjected to the crystallization step has a crystallinity of less than 10%.

3. The method for producing a crystallized polyester according to claim 1, wherein the shear of a shear rate of 10 to 400/second and/or the pressure of 0.05 to 10 MPa is applied.

4. The method for producing a crystallized polyester according to claim 1, wherein the time of applying the shear and/or the pressure is from 0.1 to 10 minutes.

5. The method for producing a crystallized polyester according to claim 1, further comprising the step in which the polyester to be subjected to the crystallization step is poly-L-lactic acid or poly-D-lactic acid and, when the polyester is poly-L-lactic acid after converting the polyester into a state having a crystallinity of 10% or more and fluidity by the crystallization step, poly-D-lactic acid is mixed and, when the polyester is poly-D-lactic acid, poly-L-lactic acid is mixed.

6. A method for producing a crystallized polyester, which further comprises a step of mixing the crystallized polyester obtained by the method according to claim 1 with another resin.

7. The method for producing a crystallized polyester according to claim 1, which further comprises steps of cooling and solidifying, and then pelletizing the crystallized polyester after the crystallization step.

8. A method for producing a crystallized polyester, which further comprises a step of subjecting the crystallized polyester obtained by the method according to claim 1 to solid phase polymerization.

9. A method for producing a crystallized polyester, which further comprises a step of subjecting the crystallized polyester according to claim 5 to solid phase polymerization, and in the step of mixing poly-L-lactic acid and poly-D-lactic acid, at least one of poly-L-lactic acid and poly-D-lactic acid satisfies the following equation (1):

$$(\Delta Hm - \Delta Hc) > 20 \text{ (J/g)} \tag{1}$$

where $\Delta$Hm: crystal melting enthalpy (J/g), and $\Delta$Hc: crystallization enthalpy (J/g) upon temperature increase.

10. The method for producing a crystallized polyester according to claim 1, wherein polyester to be subjected to the crystallization step is an oligomer or a prepolymer of polylactic acid.

11. A method for producing a crystallized polyester according to claim 1, which comprises a polymerization step of reacting a lactic acid to produce an oligomer or a prepolymer; a crystallization step of applying a shear and/or a pressure at a temperature of (Tm−70° C.) to (Tm+20° C.), where Tm is a melting point of the oligomer or prepolymer, thereby converting the polyester into a state having a crystallinity of 10% or more and fluidity; a step of cooling and solidifying, and pelletizing the obtained crystallized polyester; and a step of subjecting the obtained pellet to solid phase polymerization; in this order, wherein the oligomer or prepolymer obtained by the polymerization step is subjected to the crystallization step without solidifying.

12. The method for producing a crystallized polyester according to claim 11, wherein the crystallization step is carried out using a melting machine, and a temperature of the melting machine in the crystallization step is controlled according to a pressure of a resin measured by a pressure gauge mounted to at least one of the melting machine and pelletizers used in the said pelletize step, wherein the temperature of the melting machine is lowered when the pressure decreases and the temperature of the melting machine is raised when the pressure increases.

* * * * *